US012528888B2

(12) United States Patent
Mollat Du Jourdin et al.

(10) Patent No.: US 12,528,888 B2
(45) Date of Patent: Jan. 20, 2026

(54) PROCESS FOR PRODUCING AN AQUEOUS POLYMER DISPERSION

(71) Applicant: BASF SE, Ludwigshafen am Rhein (DE)

(72) Inventors: Xavier Mollat Du Jourdin, Seneffe (BE); Joost Leswin, Ludwigshafen am Rhein (DE); Michaela Reinsch, Ludwigshafen am Rhein (DE); Nicole Specht, Ludwigshafen am Rhein (DE); Janine Einhorn-Rech, Ludwigshafen am Rhein (DE); Joerg Alexander Dimmer, Shanghai (CN); Rainer Pache, Ludwigshafen am Rhein (DE); Jochen Gattermayer, Ludwigshafen am Rhein (DE); Hans-Juergen Denu, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 1032 days.

(21) Appl. No.: 17/629,816

(22) PCT Filed: Jul. 24, 2020

(86) PCT No.: PCT/EP2020/070942
§ 371 (c)(1),
(2) Date: Jan. 25, 2022

(87) PCT Pub. No.: WO2021/018767
PCT Pub. Date: Feb. 4, 2021

(65) Prior Publication Data
US 2023/0348633 A1  Nov. 2, 2023

(30) Foreign Application Priority Data
Jul. 26, 2019  (EP) ..................... 19188544

(51) Int. Cl.
*C08F 2/22* (2006.01)
*C08F 2/00* (2006.01)
(Continued)

(52) U.S. Cl.
CPC ............... *C08F 2/22* (2013.01); *C08F 2/001* (2013.01); *C08F 2/38* (2013.01); *C08F 220/06* (2013.01);
(Continued)

(58) Field of Classification Search
CPC .... C08F 2/22; C08F 2/001; C08F 2/38; C08F 220/1804; C08F 220/06; C08F 220/14;
(Continued)

(56) References Cited

U.S. PATENT DOCUMENTS

| 4,079,028 A | 3/1978 | Emmons et al. |
| 4,155,892 A | 5/1979 | Emmons et al. |

(Continued)

FOREIGN PATENT DOCUMENTS

| DE | 4003422 A1 | 8/1991 |
| DE | 4137247 A1 | 5/1993 |

(Continued)

OTHER PUBLICATIONS

International Search Report and Written Opinion received for PCT Patent Application No. PCT/EP2020/070942, mailed on Aug. 20, 2020, 9 pages.

(Continued)

*Primary Examiner* — Kelechi C Egwim
(74) *Attorney, Agent, or Firm* — Faegre Drinker Biddle & Reath LLP

(57) ABSTRACT

The present application relates to a process for producing an aqueous polymer dispersion of polymerized ethylenically unsaturated monomers M by a multistage aqueous radical emulsion polymerization comprising a first aqueous radical emulsion polymerization step of a first monomer composition M.a and subsequently a further aqueous radical emulsion polymerization step of a second monomer composition M.b. The present application also relates to aqueous polymer dispersions obtainable by such a process and to the use thereof, in particular as a binder in coating compositions. The process comprises a multistage aqueous radical emulsion polymerization of ethylenically unsaturated monomers M, comprising a) at least one non-ionic, monoethylenically unsaturated monomer M1 having a solubility in deionized water of at most 60 g/L at 25° C. and 1 bar, b) at least one monoethylenically unsaturated monomer M2 selected from monomers having an acid group and their salts, and c) optionally one or more ethylenically unsaturated monomers M3, which are different from the monomers M1 and M2, where the process comprises i) a first step of an aqueous radical emulsion polymerization of a first monomer composition M.a consisting of monomers M1, M2 and optionally M3, to obtain a first aqueous polymer dispersion, where the monomer composition M.a comprises at most 2% by weight, in particular at most 1.5% by weight and especially at most 1.5% by weight or at most 1.0% by weight, based on the total weight of the monomers of the monomer composition M.a, of monomers M2, and subsequently ii) at least one further aqueous radical emulsion polymerization step of a second monomer composition M.b consisting of monomers M1, M2 and optionally M3, where the second step is performed in the aqueous polymer dispersion of the first step and in the presence of a chain transfer agent T, where the monomer composition M.b comprises 2 to 20% by weight, in particular from 5 to 18% by weight and especially from 8 to 16% by weight, based on the total weight of the monomers of the monomer composition M.b, of at least one monomer M2, where the weight ratio of the total weight of (Continued)

monomers of monomer composition M.a to the total weight of monomers of monomer composition M.b is in the range from 10:90 to 90:10, in particular in the range from 50:50 to 87:13, especially in the range from 60:40 to 85:15.

15 Claims, No Drawings

(51) Int. Cl.
    *C08F 2/38* (2006.01)
    *C08F 220/06* (2006.01)
    *C08F 220/14* (2006.01)
    *C08F 220/18* (2006.01)
    *C08K 5/14* (2006.01)
    *C08K 5/37* (2006.01)
    *C09D 133/12* (2006.01)

(52) U.S. Cl.
    CPC ...... *C08F 220/14* (2013.01); *C08F 220/1804* (2020.02); *C08K 5/14* (2013.01); *C08K 5/37* (2013.01); *C09D 133/12* (2013.01); *C08F 2800/20* (2013.01)

(58) Field of Classification Search
    CPC ......... C08F 2800/20; C08K 5/14; C08K 5/37; C09D 133/12
    USPC ........................................................ 524/460
    See application file for complete search history.

(56) References Cited

U.S. PATENT DOCUMENTS

| | | | |
|---|---|---|---|
| 4,269,749 | A | 5/1981 | Marriott et al. |
| 4,916,171 | A | 4/1990 | Brown et al. |
| 5,401,582 | A | 3/1995 | Weyland et al. |
| 6,096,858 | A | 8/2000 | Dobbelaar et al. |
| 8,877,848 | B1 | 11/2014 | Wang et al. |
| 2011/0166291 | A1 | 7/2011 | Tuerk et al. |

FOREIGN PATENT DOCUMENTS

| | | | |
|---|---|---|---|
| DE | 19624299 | A1 | 1/1997 |
| DE | 19621027 | A1 | 11/1997 |
| DE | 19741184 | A1 | 3/1999 |
| DE | 19741187 | A1 | 3/1999 |
| DE | 19805122 | A1 | 4/1999 |
| DE | 19828183 | A1 | 12/1999 |
| DE | 19839199 | A1 | 3/2000 |
| DE | 19840586 | A1 | 3/2000 |
| DE | 19847115 | C1 | 5/2000 |
| DE | 102004008015 | A1 | 9/2005 |
| DE | 102004031786 | A1 | 1/2006 |
| EP | 0061822 | A1 | 10/1982 |
| EP | 0307775 | A2 | 3/1989 |
| EP | 0348565 | A1 | 1/1990 |
| EP | 0612329 | A1 | 8/1994 |
| EP | 0771328 | A1 | 5/1997 |
| EP | 1013264 | A1 | 6/2000 |
| EP | 1541643 | A1 | 6/2005 |
| EP | 1584331 | A1 | 10/2005 |
| EP | 2184304 | A1 | 5/2010 |
| EP | 2371870 | A1 | 10/2011 |
| EP | 2617743 | A1 | 7/2013 |
| WO | 93/10166 | | 5/1993 |
| WO | 95/04767 | A1 | 2/1995 |
| WO | 95/29963 | A1 | 11/1995 |
| WO | 95/33775 | A1 | 12/1995 |
| WO | 96/31550 | A1 | 10/1996 |
| WO | 2011/154920 | A1 | 12/2011 |
| WO | 2012/052508 | A2 | 4/2012 |
| WO | 2012/084973 | A1 | 6/2012 |
| WO | 2016/169819 | A1 | 10/2016 |
| WO | 2017/106994 | A1 | 6/2017 |
| WO | WO-2012158703 | A1 * | 11/2021 .............. C08L 33/12 |

OTHER PUBLICATIONS

Samant et al., "Development of emulsions for coalescing solvent free glossy emulsion paint", paintindia, 2002, pp. 31-44.

* cited by examiner

PROCESS FOR PRODUCING AN AQUEOUS POLYMER DISPERSION

CROSS-REFERENCE TO RELATED APPLICATIONS

This application is a national stage application (under 35 U.S.C. § 371) of PCT/EP2020/070942, filed Jul. 24, 2020, which claims benefit of European Application No. 19188544.1, filed Jul. 26, 2019, both of which are incorporated herein by reference in their entirety.

The present application relates to a process for producing an aqueous polymer dispersion of polymerized ethylenically unsaturated monomers M by a multistage aqueous radical emulsion polymerization comprising a first aqueous radical emulsion polymerization step of a first monomer composition M.a and subsequently a further aqueous radical emulsion polymerization step of a second monomer composition M.b. The present application also relates to aqueous polymer dispersions obtainable by such a process and to the use thereof, in particular as a binder in coating compositions.

BACKGROUND OF THE INVENTION

Polymer dispersions of polymerized ethylenically unsaturated monomers M are commonly known, in particular as binder component. As a binder, in particular in coatings, one of the important requirements for such binders is that they provide high mechanical strength and hardness to the coating and hence, provide good stability against mechanical impact and good blocking resistance. At the same time, the coating must be elastic in order to compensate mechanical stress. Furthermore, good filming properties, in particular low film forming temperatures, i.e. filming of the binder in the range of from 0 to 40° C., are highly desirable in order to minimize the required amount of film-forming agent. In this context, the binder should allow for crack-free film formation at high coating thickness in order to allow for an efficient coating procedure. For exterior coatings a low water-uptake and a good soil resistance is also desirable.

Principally, multistage aqueous polymer dispersions combining a polymer phase having a comparatively low glass transition temperature and another polymer phase having a comparatively high glass transition temperature may improve filming properties, because the polymer phase having the low glass transition temperature serves for good filming properties while the polymer phase having the high glass transition temperatures improves the mechanical properties of the coating, such as blocking resistance, hardness of the polymer film and scratch resistance. These polymer dispersions are usually prepared by a so-called two step aqueous emulsion polymerization, where the two polymer phases are prepared in subsequent emulsion polymerization steps.

An improved process for obtaining improved polymer dispersions having both good mechanical properties and low film forming temperatures includes a multi-step emulsion polymerization. In the first polymerization step an acidic low molecular weight polymer is produced which is neutralized by addition of a base before the second polymerization step is performed, where hydrophobic monomers are polymerized in the presence of the neutralized polymer obtained in the first polymerization step. Such processes are described e.g. in U.S. Pat. No. 4,916,171, EP 348565, WO 95/04767, WO 95/29963 and WO 2012/084973.

EP 2371870 describes polymer dispersions having a polymer shell prepared having a low molecular weight and an acid number in the range from 5 to 100 and a polymer core having a high molecular weight and an acid number of at most the half the acid number of the polymer shell. The polymer dispersions are prepared by a multistage emulsion polymerization comprising the polymerization of a first monomer mixture, which forms the shell, in the presence of a chain transfer agent and then polymerizing the monomer composition forming the core essentially in the absence of a chain transfer agent. However, the film forming properties of the polymer dispersions are not satisfactory and higher coating thickness may result in crack formation.

C. A. Samant and K. Krishnaraj, Paintindia, February 2003, pp. 31-41 describe different single stage and multistage aqueous polymer dispersions. In the multistage dispersions different type of crosslinkers and silane monomers are used. Crosslinkers may improve gloss, while silane monomers may increase water resistance. However, high amounts of sodium vinylsulfonate are required for stabilizing the polymer dispersion. Moreover, the film forming properties are not satisfactory and higher coating thickness may result in crack formation.

WO 2012/158703 describes a self-coalescing latex containing a latex and a film-forming polymer of low molecular weight, which is compatible with the latex. The latex is prepared by a multistage emulsion polymerization comprising the formation of a first stage of polymerized "hard" monomers, a second stage of polymerized soft monomers and a third stage which is the low molecular weight film forming polymer. The latex provides for good block resistance and good scrub resistance and low temperature coalescence. However, it requires a three-step emulsion polymerization and considerable amounts of expensive wet adhesion monomers.

WO 2017/106994 describes polymer dispersions obtained by a multistage emulsion polymerization. The polymer dispersion comprises from 88 to 98% by weight of a polymer core and from 2 to 12% by weight of a polymer shell, where the core and the polymer shell are based on ethylenically unsaturated, nonionic monomers and where the polymer shell additionally contains from 20 to 60% by weight of an acid monomer.

The properties of these polymer dispersions are still not completely satisfactory. In particular, it is still challenging to achieve both good filming properties and good coating properties, in particular with low amounts or even in absence of volatile organic film forming agents. Moreover, it is challenging to achieve polymer dispersions, which can be formulated as waterborne paints that can be applied with high coating thickness without resulting in crack formation and which result in good coating properties, such as high mechanical strength, low water-uptake, good soiling resistance.

SUMMARY OF THE INVENTION

It is an object of the present invention to provide an aqueous polymer dispersion based on polymerized ethylenically unsaturated monomers M, which have good filming properties, in particular with low amounts or even in absence of volatile organic film forming agents, which can be formulated as waterborne paints that can be applied with high coating thickness without resulting in crack formation and which result in good coating properties, such as high mechanical strength, low water-uptake, good dirt/soiling resistance.

It was surprisingly found that aqueous polymer dispersion of polymerized ethylenically unsaturated monomers M, which are produced by a multistage aqueous radical emulsion polymerization as described herein have improved filming properties and allow for producing coating compositions which can be applied with high coating thickness and which, due to the good coating properties, are particularly suitable for exterior coatings, especially for concrete roof tiles and fiber cement boards.

The process comprises a multistage aqueous radical emulsion polymerization of ethylenically unsaturated monomers M, comprising or consisting of
   a) at least one non-ionic, monoethylenically unsaturated monomer M1 having a solubility in deionized water of at most 60 g/L at 25° C. and 1 bar,
   b) at least one monoethylenically unsaturated monomer M2 selected from monomers having an acid group and their salts, and
   c) optionally one or more ethylenically unsaturated monomers M3, which are different from the monomers M1 and M2,
   where the process comprises
   i) a first step of an aqueous radical emulsion polymerization of a first monomer composition M.a consisting of monomers M1, M2 and optionally M3, to obtain a first aqueous polymer dispersion, where the monomer composition M.a comprises at most or less than 2% by weight, e.g. at most 1.9% by weight or at most 1.8% by weight, in particular at most 1.5% by weight and especially at most 1.2% by weight or at most 1.0% by weight, based on the total weight of the monomers of the monomer composition M.a, of monomers M2, and subsequently
   ii) at least one further aqueous radical emulsion polymerization step of a second monomer composition M.b consisting of monomers M1, M2 and optionally M3, where the second step is performed in the aqueous polymer dispersion of the first step and in the presence of a chain transfer agent T, where the monomer composition M.b comprises 2 to 20% by weight, in particular from 5 to 18% by weight and especially from 8 to 16% by weight, based on the total weight of the monomers of the monomer composition M.b, of at least one monomer M2,
   where the weight ratio of the total weight of monomers of monomer composition M.a to the total weight of monomers of monomer composition M.b is in the range from 10:90 to 90:10, in particular in the range from 50:50 to 87:13, especially in the range from 60:40 to 85:15.

A further aspect of the present invention relates to an aqueous polymer dispersion obtainable by the process according as defined herein.

A further aspect of the present invention relates to the use of an aqueous polymer dispersion according to the present invention as defined herein as a binder or cobinder in a waterborne coating composition.

The present invention also relates to waterborne coating compositions, which contain the aqueous polymer dispersion as described herein.

Further aspects of the present invention relates to a method for producing a coating on a surface comprising applying the waterborne coating composition according to the present invention to a surface and allowing the composition to dry to produce the coating.

The aqueous polymer dispersions as described herein provides several benefits, in particular
   the aqueous polymer dispersions have low minimum film forming temperatures and thus can be formulated as waterborne coating formulations, such as paints, with low amounts of or even in absence of volatile organic film forming agents;
   waterborne coating formulations, such as paints, which contain the aqueous polymer dispersion as a binder, in particular as the sole binder, can be applied with high coating thickness, such as 500 μm or higher, without crack formation;
   the aqueous polymer dispersions of the present invention can be readily prepared by a multistage emulsion polymerization, in particular by a two stage emulsion polymerization;
   the aqueous polymer dispersions of the present invention do not require great amounts of expensive monomers;
   the aqueous polymer dispersions have good filming properties and at the same time provide for good coating properties, such as high mechanical strength, low or even reduced water-uptake, good or even improved dirt/soiling resistance.

DETAILED DESCRIPTION OF THE INVENTION

Here and throughout the specification, the term "waterborne coating composition" means a liquid aqueous coating composition containing water as the continuous phase in an amount sufficient to achieve flowability.

Here and throughout the specification, the terms "wt.-%" and "% by weight" are used synonymously.

Here and throughout the specification, the term "polymer latex" and "polymer dispersion" are used as synonyms and means an aqueous polymer composition of a water-insoluble polymer, where the polymer is present in the form of finely dispersed polymer particles.

Here and throughout the specification, the term "pphm" means parts by weight per 100 parts of monomers and corresponds to the relative amount in % by weight of a certain monomer based on the total amount of monomers M.

Here and throughout the specification, the term "comprises" with regard to an enumeration of components means that the also includes the meaning "consists of" and "essentially consists of". In this regard, the term "consists of" means that no components other than the enumerated components are present. The term "essentially consists of" means that not more than 1% by weight, in particular not more than 0.5% by weight or not more than 0.1% by weight, based on the enumerated components, of components other than the enumerated components are present.

Here and throughout the specification, the terms "ethoxylated" and "polyethoxylated" are used synonymously and refer to compounds having an oligo- or polyoxyethylene group, which is formed by repeating units $O-CH_2CH_2$. In this context, the term "degree of ethoxylation" relates to the number average of repeating units $O-CH_2CH_2$ in these compounds.

Here and throughout the specification, the term "non-ionic" in the context of compounds, especially monomers, means that the respective compound does not bear a ionic functional group or a functional group which can be converted by protonation or deprotonation into a ionic group.

Here and throughout the specification, the prefixes $C_n$-$C_m$ used in connection with compounds or molecular moieties each indicate a range for the number of possible carbon atoms that a molecular moiety or a compound can have. The term "$C_1$-$C_n$ alkyl" denominates a group of linear or branched saturated hydrocarbon radicals having from 1 to n carbon atoms. The term "$C_n/C_m$ alkyl" denominates a mixture of two alkyl groups, one having n carbon atoms while the other having m carbon atoms.

Here and throughout the specification, the term "ethylenically unsaturated monomer" is understood that the monomer has at least one C=C double bond, e.g. 1, 2, 3 or 4 C=C double bonds, which are radically polymerizable, i.e. which under the conditions of an aqueous radical emulsion are polymerized to obtain a polymer having a backbone of carbon atoms. Here and throughout the specification, the term "monoethylenically unsaturated" is understood that the monomer has a single C=C double bond, which is susceptible to radical polymerization under conditions of an aqueous radical emulsion polymerization. For example, in monomers having two conjugated C=C double bonds, such as in butadiene, only a single C=C double bond is susceptible to radical polymerization under conditions of an aqueous radical emulsion polymerization.

For example, the term $C_1$-$C_{20}$ alkyl denominates a group of linear or branched saturated hydrocarbon radicals having from 1 to 20 carbon atoms, while the term $C_1$-$C_4$ alkyl denominates a group of linear or branched saturated hydrocarbon radicals having from 1 to 4 carbon atoms. Examples of alkyl include but are not limited to methyl, ethyl, n-propyl, isopropyl, n-butyl, sec-butyl, isobutyl, tert-butyl, 2-methylpropyl (isopropyl), 1,1-dimethylethyl (tert.-butyl), pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, heptyl, octyl, 2-ethylhexyl, nonyl, isononyl, decyl, undecyl, dodecyl, tridecyl, isotridecyl, tetradecyl, pentadecyl, hexadecyl, heptadecyl, octadecyl, nonadecyl, eicosyl, heneicosyl docosyl and in case of nonyl, isononyl, decyl, undecyl, dodecyl, tridecyl, isotridecyl, tetradecyl, pentadecyl, hexadecyl, heptadecyl, octadecyl, nonadecyl, eicosyl, heneicosyl, docosyl their isomers, in particular mixtures of isomers such as "isononyl", "isodecyl". Examples of $C_1$-$C_4$-alkyl are for example methyl, ethyl, propyl, 1-methylethyl, butyl, 1-methylpropyl, 2-methylpropyl or 1,1-dimethylethyl.

The term "$C_5$-$C_{20}$-cycloalky"" as used herein refers to a mono- or bicyclic cycloalkyl radical which is unsubstituted or substituted by 1, 2, 3 or 4 $C_1$-$C_4$-alkyl radicals, e.g. methyl groups, where the total number of carbon atoms of $C_5$-$C_{20}$-cycloalkyl is from 5 to 20. Examples of $C_5$-$C_{20}$-alkyl include but are not limited to cyclopentyl, cyclohexyl, methylcyclohexyl, dimethylcyclohexyl, cycloheptyl, cyclooctyl, cyclododecyl, cyclohexadecyl, norbornyl (=bicyclo[2.2.1]heptyl) and isobornyl (=1,7,7-trimethylbicyclo [2.2.1]heptyl).

The aqueous polymer dispersion of the present invention is obtainable by a multistage aqueous radical emulsion polymerization of ethylenically unsaturated monomers M. According to the invention these monomers M comprise or consist of
 a) at least one non-ionic, monoethylenically unsaturated monomer M1, which has a solubility in deionized water of at most 60 g/L, in particular at most 45 g/L at 25° C. and 1 bar, and
 b) at least one monoethylenically unsaturated monomer M2, which is selected from the group consisting of monomers having an acid group and the salts thereof.

In addition, the monomers M may comprise one or more ethylenically unsaturated monomers M3, which are different from the monomers M1 and M2.

In particular, the monomers M comprise or consist of:
 a) 80 to 99.5% by weight, in particular 90 to 99% by weight, especially 95 to 98.5% by weight, based on the total weight of the monomers M, of at least one monomer M1,
 b) 0.5 to 10% by weight, in particular 1 to 8% by weight, especially 1.5 to 6% by weight, based on the total weight of the monomers M, of at least one monomer M2, and optionally
 c) 0 to 10% by weight, in particular 0 to 8% by weight, especially 0 to 5% by weight, based on the total weight of the monomers M, of one or more monomers M3.

Suitable monomers M1 include, but are not limited to
 $C_1$-$C_{20}$-alkyl esters of monoethylenically unsaturated monocarboxylic acids having 3 to 6 carbon atoms, in particular $C_1$-$C_{20}$-alkyl esters of acrylic acid and $C_1$-$C_{20}$-alkyl esters of methacrylic acid;
 $C_5$-$C_{20}$-cycloalkyl esters of monoethylenically unsaturated monocarboxylic acids having 3 to 6 carbon atoms, in particular $C_5$-$C_{20}$-cycloalkyl esters of acrylic acid and $C_5$-$C_{20}$-cycloalkyl esters of methacrylic acid;
 di-$C_1$-$C_{20}$-alkyl esters of monoethylenically unsaturated dicarboxylic acids having 4 to 6 carbon atoms, in particular di-$C_1$-$C_{20}$-alkyl esters of maleic acid, di-$C_1$-$C_{20}$-alkyl esters of fumaric acid and di-$C_1$-$C_{20}$-alkyl esters of itaconic acid;
 vinylesters of $C_1$-$C_{20}$-alkanoic acids, in particular the vinylester of acetic acid (vinyl acetate), vinylester of propionic acid (vinyl propionate) and the vinylesters of $C_5$-$C_{12}$ branched alkanoic acids (vinyl esters of versatic acids);
 monovinyl aromatic hydrocarbon monomers, such as styrene;
 $C_2$-$C_6$-monoolefines, such as ethylene or propene and conjugated hydrocarbon diolefines such as butadiene and isoprene.

Preferred monomers M1 are selected from the group consisting of $C_1$-$C_{20}$-alkyl esters of acrylic acid, $C_1$-$C_{20}$-alkyl esters of methacrylic acid, $C_5$-$C_{20}$-cycloalkyl esters of acrylic acid, $C_5$-$C_{20}$-cycloalkyl esters of methacrylic acid, monovinyl aromatic hydrocarbon monomers, and mixtures thereof.

Suitable $C_1$-$C_{20}$-alkyl esters of acrylic acid include but are not limited to methyl acrylate, ethyl acrylate, n-propyl acrylate, isopropyl acrylate, n-butyl acrylate, sec-butyl acrylate, isobutyl acrylate, tert-butyl acrylate, n-pentyl acrylate, n-hexyl acrylate, n-octyl acrylate, 2-ethylhexyl acrylate, n-decyl acrylate, isodecyl acrylate, 2-propylheptyl acrylate, lauryl acrylate, $C_{12}$/$C_{14}$-alkyl acrylate, $C_{12}$-$C_{15}$-alkyl acrylate, isotridecyl acrylate, $C_{16}$/$C_{18}$-alkyl acrylate and stearyl acrylate.

Suitable $C_5$-$C_{20}$-cycloalkyl esters of acrylic acid include but are not limited to cyclohexylacrylate, norbornylacrylate and isobornylacrylate.

Suitable $C_1$-$C_{20}$-alkyl esters of methacrylic acid include but are not limited to
 $C_1$-$C_4$-alkyl esters of methacrylic acid, such as methyl methacrylate, ethyl methacrylate, n-propyl methacrylate, isopropyl methacrylate, n-butyl methacrylate, sec-butyl methacrylate, isobutyl methacrylate and tert-butyl methacrylate; and
 $C_5$-$C_{20}$-alkylesters of methacrylic acid, such as n-pentyl methacrylate, n-hexyl methacrylate, n-octyl methacrylate, 2-ethylhexyl methacrylate, n-decyl methacrylate, 2-propylheptyl methacrylate, lauryl methacrylate, $C_{12}/C_{14}$-alkyl methacrylate, $C_{12}$-$C_{15}$-alkyl methacrylate, isotridecyl methacrylate, $C_{16}/C_{18}$-alkyl methacrylate and stearyl methacrylate;
and mixtures thereof.

Suitable $C_5$-$C_{16}$-cycloalkyl esters of methacrylic acid include but are not limited to cyclohexyl methacrylate, norbornyl methacrylate and isobornyl methacrylate.

Suitable vinyl aromatic monomers include but are not limited to mono-vinyl substituted aromatic hydrocarbons such as styrene, 2-methylstyrene, 4-methylstyrene, 2-n-butylstyrene, 4-n-butylstyrene, 4-n-decylstyrene and α-methylstyrene, with particular preference given to styrene.

Preferably, monomers M1 are selected from the group consisting of
  $C_2$-$C_{10}$-alkyl esters of acrylic acid,
  in particular ethyl acrylate, n-butyl acrylate, tert-butyl acrylate, n-hexyl acrylate, n-octyl acrylate, 2-ethylhexyl acrylate, 2-propylheptyl acrylate and mixtures thereof, such as for example mixtures of n-butyl acrylate and 2-ethylhexyl acrylate or mixtures of n-butyl acrylate and ethyl acrylate or mixtures of ethyl acrylate, n-butyl acrylate, tert-butyl acrylate and 2-ethylhexyl acrylate;
  $C_1$-$C_4$-alkyl esters of methacrylic acid, in particular methyl methacrylate;
  monovinyl aromatic monomers, especially styrene.

Preferably, the monomers M1 are a combination of
  at least one monomer M1.1, selected from $C_1$-$C_{20}$-alkyl esters of acrylic acid and $C_5$-$C_{20}$-alkylesters of methacrylic acid; and
  at least one monomer M1.2, selected from monovinyl aromatic monomers, and $C_1$-$C_4$-alkyl esters of methacrylic acid and mixtures thereof.

More particularly, the monomers M1 are a combination of
  at least one monomer M1.1, selected from $C_2$-$C_{10}$-alkyl esters of acrylic acid, such as ethyl acrylate, n-butyl acrylate, n-hexyl acrylate, n-octyl acrylate, 2-ethylhexyl acrylate, 2-propylheptyl acrylate and mixtures thereof; and
  at least one monomer M1.2, selected from monovinyl aromatic monomers, such as styrene, and $C_1$-$C_4$-alkyl esters of methacrylic acid, such as methyl methacrylate, and mixtures thereof.

Especially, the monomers M1 are a combination of
  at least one monomer M1.1, selected from $C_2$-$C_{10}$-alkyl esters of acrylic acid; and
  at least one monomer M1.2, selected from styrene and methyl methacrylate and mixtures thereof.

Preference is given to monomers M1, which comprise less than 20%, in particular not more than 10% by weight, especially not more than 5% by weight, based on the total amount of monomers M, of monovinyl aromatic monomers. In particular, the monomers M1 do not contain vinyl aromatic monomers at all.

Therefore, in a preferred group of embodiments the monomers M1 are a combination of
  at least one monomer M1.1, selected from $C_1$-$C_{20}$-alkyl esters of acrylic acid and $C_5$-$C_{20}$-alkylesters of methacrylic acid and mixtures thereof; and
  at least one monomer M1.2, selected from $C_1$-$C_4$-alkyl esters of methacrylic acid monomers and mixtures thereof.

In particular, the monomers M1 are a combination of
  at least one monomer M1.1, selected from $C_2$-$C_{10}$-alkyl esters of acrylic acid, in particular ethyl acrylate, n-butyl acrylate, n-hexyl acrylate, n-octyl acrylate, 2-ethylhexyl acrylate, 2-propylheptyl acrylate and mixtures thereof, such as for example mixtures of n-butyl acrylate and 2-ethylhexyl acrylate or mixtures of n-butyl acrylate and ethyl acrylate or mixtures of ethyl acrylate, n-butyl acrylate and 2-ethylhexyl acrylate; and
  at least one monomer M1.2, selected from $C_1$-$C_4$-alkyl esters of methacrylic acid, in particular methyl methacrylate.

More particularly, the monomers M1 are a combination of
  at least one monomer M1.1, selected from $C_2$-$C_{10}$-alkyl esters of acrylic acid, in particular from ethyl acrylate, n-butyl acrylate, n-hexyl acrylate, n-octyl acrylate, 2-ethylhexyl acrylate, 2-propylheptyl acrylate and mixtures thereof; and
  at least one monomer M1.2, selected from $C_1$-$C_4$-alkyl esters of methacrylic acid, in particular methyl methacrylate.

In the combination of monomers M1.1 and M1.2, the weight ratio of monomers M1.1 to monomers M1.2 may vary in particular from 10:1 to 1:10, more particularly from 5:1 to 1:5, especially from 3:1 to 1:3. The ratio of monomers M1.1 to M1.2 will affect the glass transition temperature and a proper mixture will result in the desired glass transition temperatures.

According to the invention, the at least one monoethylenically unsaturated monomer M2 is selected from monoethylenically unsaturated monomers, which have an acid group, such as a carboxyl group (COOH), a sulfonyl group ($SO_3H$), a phosphoryl group ($PO(OH)_2$) or a phosphate group (—O—$PO(OH)_2$) and their salts thereof.

Suitable monomers M2 include, but are not limited to
  monoethylenically unsaturated monocarboxylic acids having 3 to 6 carbon atoms (monomers M2.1), such as acrylic acid, methacrylic acid, crotonic acid, 2-ethylpropenoic acid, 2-propylpropenoic acid, 2-acryloxyacetic acid and 2-methacryloxyacetic acid;
  monoethylenically unsaturated dicarboxylic acids having 4 to 6 carbon atoms (monomers M2.2), such as itaconic acid and fumaric acid;
  monoethylenically unsaturated sulfonic acids and salts thereof (monomers M2.3), such as vinylsulfonic acid, allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids and 2-acrylamido-2-methylpropanesulfonic acid, especially salts thereof, specifically the sodium salts thereof. Amongst monomers M2.3 particular preference is given to 2-acrylamido-2-methylpropanesulfonic acid and the salts thereof, in particular the sodium salt thereof;
  monoethylenically unsaturated monomers having a phosphate or phosphoryl group group and salts thereof (monomers M2.4), such as vinylphosphonic acid, allylphosphonic acid, 2-phosphonoethyl acrylate, 2-phosphonoethyl methacrylate, phosphonopropyl acrylate, phosphonopropyl methacrylate, styrenephosphonic acids, 2-acrylamido-2-methylpropanephosphonic acid, and phosphoric monoesters of the hydroxy-$C_2$-$C_4$-alkyl esters of monoethylenically unsaturated $C_3$-$C_8$ monocarboxylic acids specified hereinafter, for example the phosphoric monoesters of 2-hydroxyethyl (meth)acrylate, 3-hydroxypropyl (meth)acrylate, 4-hydroxybutyl (meth)acrylate, and especially the salts of the aforementioned monoethylenically unsaturated monomers having a phosphate or phosphonate group, specifically the sodium salts thereof;

and combinations of the aforementioned monomers M2.

The acidic monomers M2 preferably comprise at least one monomer selected from the group consisting of monoethylenically unsaturated monocarboxylic acids having 3 to 6 carbon atoms and monoethylenically unsaturated dicarboxylic acids having 4 to 6 carbon atoms and mixtures thereof. In particular, the acidic monomers M2 preferably comprise at least one monomer selected from the group consisting of the aforementioned monomers M2.1, with particular preference given to methacrylic acid and mixtures thereof with acrylic acid.

Preferably, the monomers M2 comprise at least 50% by weight, in particular at least 70% by weight of one or more monomers M2.1, based on the total amount of monomers M2. Preference is also given to a combination of at least one monomer M2.1 and at least one further monomer selected from the monomers M2.3 and M2.4, the monomers M2 comprise from 50 to 99.9% by weight, in particular from 70 to 99% by weight, based on the total amount of monomers M2, of one or more monomers M2.1 and from 0.1 to 50% by weight, in particular from 1 to 30% by weight, based on the total amount of monomers M2, of one or more monomers selected from the monomers M2.3 and M2.4 with particular preference given to 2-acrylamido-2-methylpropanesulfonic acid, hereinafter termed AMPS, and the salts thereof, in particular the sodium salt thereof.

In a particularly preferred group of embodiments, the monomers M2 comprise at least 50% by weight, in particular at least 70% by weight of methacrylic acid, based on the total amount of monomers M2. In this particularly preferred group of embodiments, methacrylic acid may be the sole monomer or it is a combination of 50 to 99.9% by weight, in particular from 70 to 99% by weight, based on the total amount of monomers M2, of methacrylic acid and from 0.1 to 50% by weight, in particular from 1 to 30% by weight, based on the total amount of monomers M2, of one or more monomers selected from the monomers M2.3 and M2.4 with particular preference given to AMPS and the salts thereof, in particular the sodium salt thereof.

The monomers M may comprise one or more ethylenically unsaturated monomers, which are different from the monomers M1 and M2. Preferred monomers M3 are monoethylenically unsaturated nonionic monomers, i.e. they do not bear an anionic, cationic or acidic group. Particularly preferred monomers M3 are monoethylenically unsaturated nonionic monomers which have a solubility in deionized water of more than 60 g/L at 25° C. and 1 bar. Examples of suitable monoethylenically unsaturated nonionic monomers M3 include, but are not limited to primary amides of monoethylenically unsaturated monocarboxylic acids having 3 to 8 carbon atoms (monomers M3.1), such as acrylamide and methacrylamide;

N—$C_1$-$C_4$ alkyl amides of monoethylenically unsaturated monocarboxylic acids having 3 to 6 carbon atoms (monomers M3.2), in particular N—$C_1$-$C_4$ alkyl amides of acrylic acid or methacrylic acid, such as N-methyl acrylamide, N-ethyl acrylamide, N-propyl acrylamide, N-isopropyl acrylamide, N-butyl acrylamide, N-methyl methacrylamide, N-ethyl methacrylamide, N-propyl methacrylamide, N-isopropyl methacrylamide and N-butyl methacrylamide;

monoethylenically unsaturated monomers bearing urea or keto groups (Monomers M3.3), such as 2-(2-oxo-imidazolidin-1-yl)ethyl (meth)acrylate, 2-ureido (meth) acrylate, N-[2-(2-oxooxazolidin-3-yl)ethyl] methacrylate, acetoacetoxyethyl acrylate, acetoacetoxypropyl methacrylate, acetoacetoxybutyl methacrylate, 2-(acetoacetoxy)ethyl methacrylate, diacetoneacrylamide (DAAM) and diacetonemethacrylamide;

hydroxyalkyl esters of monoethylenically unsaturated $C_3$-$C_6$ monocarboxylic acids (monomers M3.4), especially hydroxyalkyl esters of acrylic acid and hydroxyalkyl esters of methacrylic acid, also referred to hereinafter as hydroxyalkyl (meth)acrylates, in particular hydroxy-$C_2$-$C_4$-alkylesters of acrylic acid and hydroxy-$C_2$-$C_4$-alkylesters of methacrylic acid, such as 2-hydroxyethyl acrylate, 3-hydroxypropyl acrylate, 4-hydroxybutyl acrylate, 2-hydroxyethyl methacrylate, 3-hydroxypropyl methacrylate, 4-hydroxybutyl methacrylate, etc.

and combinations of the aforementioned monomers M3.

Monomers M3 may also include a small amount of a silane monomer M3.5 as monomer M3. Suitable silane monomers contain an ethylenically unsaturated double bound, preferably a vinyl, allyl, acryl or methacryl group, and a silyl group, in particular a trialkoxysilyl group, such as a trimethoxysilyl or triethoxy silyl group or an alkyldialkoxysilyl group, such as a methyldimethoxysilyl, ethyldimethoxysilyl, methyldiethoxysilyl or ethyldiethoxysilyl group. Suitable silane monomers M3.5 include, for example, vinyltrialkoxysilanes, e.g. vinyltrimethoxysilane, alkylvinyldialkoxysilanes, e.g., methylvinyldialkoxysilane, or (meth) acryloxyalkyltrialkoxysilanes, e.g., (meth)acryloyloxypropyl-trimethoxysilane and (meth)acryloyloxypropyltriethoxysilane. If present, the monomers M comprise silane monomer M3.5 in amounts of up to 2% by weight, in particular from 0.05% to 1% by weight, based on the total weight of the monomers M.

Monomers M3 may also include a small amount of multiethylenically unsaturated monomers (monomers M3.6), i.e. monomers having at least 2, in particular 2 to 6 non-conjugated ethylenically unsaturated double bounds. The amounts of said monomers M3.6 will generally not exceed 2 pphm, based on the total amount of monomers M. Examples of suitable monomers M3.6 include acrylic esters, methacrylic esters, allyl ethers or vinyl ethers of polyhydric alcohols having at least 2 OH groups, e.g. from 2 to 6 OH groups. The OH groups of the polyhydric alcohols may be completely or partly etherified or esterified. The crosslinkers, however, comprise at least two ethylenically unsaturated double bonds. Examples of the polyhydric alcohols include, but are not limited to, dihydric alcohols, such as 1,2-ethanediol, 1,2-propanediol, 1,3-propanediol, 1,2-butanediol, 1,3-butanediol, 2,3-butanediol, 1,4-butanediol, but-2-ene-1,4-diol, 1,2-pentanediol, 1,5-pentanediol, 1,2-hexanediol, 1,6-hexanediol, 1,10-decanediol, 1,2-dodecanediol, 1,12-dodecanediol, neopentyl glycol, 3-methylpentane-1,5-diol, 2,5-dimethyl-1,3-hexanediol, 2,2,4-trimethyl-1,3-pentanediol, 1,2-cyclohexanediol, 1,4-cyclohexanediol, 1,4-bis(hydroxymethyl)cyclohexane, hydroxypivalic acid neopentyl glycol monoester, 2,2-bis(4-hydroxyphenyl)propane, 2,2-bis[4-(2-hydroxypropyl)-phenyl]propane, diethylene glycol, triethylene glycol, tetraethylene glycol, dipropylene glycol, tripropylene glycol, tetrapropylene glycol, 3-thiapentane-1,5-diol, and also polyethylene glycols, polypropylene glycols, block copolymers of ethylene oxide or propylene oxide, random copolymers of ethylene oxide and propylene oxide and polytetrahydrofurans having molecular weights of in each case 200 to 10 000. Examples of polyhydric alcohols having more than two OH groups are trimethylolpropane, glycerol, pentaerythritol, 1,2, 5-pentanetriol, 1,2,6-hexanetriol, cyanuric acid, sorbitan, sugars such as sucrose, glucose, and mannose. The polyhydric alcohols having more than two OH groups can be alkoxylated with ethylene oxide or propylene oxide;

monoesters of monoethylenically unsaturated $C_3$-$C_6$ monocarboxylic acids with monoethylenically unsaturated aliphatic or cycloaliphatic monohydroxy compounds, such as the acrylates and the methacrylates of vinyl alcohol (ethenol), allyl alcohol (2 propen-1-ol), 2-cyclohexen-1-ol or norbornenol and straight-chain or branched, linear or cyclic, aliphatic or aromatic hydrocarbons which possess at least two double bonds, which in the case of aliphatic hydrocarbons must not be conjugated, examples being divinylbenzene, divinyltoluene, 1,7-octadiene, 1,9-decadiene, 4-vinyl-1-cyclohexene, trivinylcyclohexane or polybutadienes having molecular weights of 200 to 20 000, in particular divinyl aromatic compounds, such as 1,3-divinyl benzene,1,4-divinyl benzene and mixtures thereof.

It is apparent that the aforementioned monomers M3 may be combined, e.g. 1 or 2 monomers selected from monomers M3.1, M3.2, M3.3 and M3.4 may be combined with one or two monomers selected from monomers M3.5 and M3.6 or a monomer M3.5 may be combined with a monomer M3.6.

According to the invention, the ethylenically unsaturated monomers M are polymerized in a multistage aqueous radical emulsion polymerization, in particular by a two stage aqueous radical emulsion polymerization which comprises a
i) a first step of an aqueous radical emulsion polymerization of a first monomer composition M.a, and
ii) at least one, in particular exactly one further aqueous radical emulsion polymerization step of a second monomer composition M.b.

According to the invention, the monomer composition M.a contains at least one monomer M1 and at most or less than 2% by weight, e.g. at most 1.9% by weight or at most 1.8% by weight, in particular at most 1.5% by weight and especially at most 1.2% by weight or at most 1.0% by weight, based on the total amount of monomers in the monomer composition M.a, of one or more monomers M2 or even no monomer M2. Frequently, the amount of monomers M1 in the monomer composition M.a is at least 90% by weight, in particular at least 95% by weight, based on the total amount of monomers in the monomer composition M.a. If present, the amount of monomers M2 in the monomer composition is in the range of 0.01 to less than 2% by weight, e.g. in the range of 0.01 to 1.9% by weight or in the range of 0.01 to 1.8% by weight, in particular in the range from 0.1 to 1.5% by weight and especially in the range of 0.1 to 1.2% by weight or in the range of 0.1 to 1.0% by weight, based on the total amount of monomers in the monomer composition M.a. However, the monomer M2 may also be absent in the monomers M.a, i.e. the monomers M.a comprise 0% by weight of monomers M2. In any case, the relative amount of monomers M2 in the M.a is lower than the relative amount of the monomers M2 in the monomers M.b, e.g. by at least 0.1% by weight, in particular by at least 0.5% by weight or at least 1.0% by weight, based on the respective monomer composition.

Preferred monomers M1 in the monomer composition M.a are those mentioned as preferred monomers M1. In particular, the monomers M1 in the monomer composition M.a are selected from the group consisting of $C_2$-$C_{10}$-alkyl esters of acrylic acid, in particular ethyl acrylate, n-butyl acrylate, tert-butyl acrylate, n-hexyl acrylate, n-octyl acrylate, 2-ethylhexyl acrylate, 2-propylheptyl acrylate and mixtures thereof, such as for example mixtures of n-butyl acrylate and 2-ethylhexyl acrylate or mixtures of n-butyl acrylate and ethyl acrylate or mixtures of ethyl acrylate, n-butyl acrylate, tert-butyl acrylate and 2-ethylhexyl acrylate;

$C_1$-$C_4$-alkyl esters of methacrylic acid, in particular methyl methacrylate;

monovinyl aromatic monomers, especially styrene.

Preferably, the monomers M1 in the monomer composition M.a are a combination of at least one monomer M1.1 as defined herein and at least one monomers M1.2 as defined herein.

More particularly, the monomers M1 are a combination of
at least one monomer M1.1, selected from $C_2$-$C_{10}$-alkyl esters of acrylic acid, such as ethyl acrylate, n-butyl acrylate, n-hexyl acrylate, n-octyl acrylate, 2-ethylhexyl acrylate, 2-propylheptyl acrylate and mixtures thereof; and
at least one monomer M1.2, selected from monovinyl aromatic monomers, such as styrene, and $C_1$-$C_4$-alkyl esters of methacrylic acid, such as methyl methacrylate, and mixtures thereof.

Especially, the monomers M1 in the monomer composition M.a are a combination of
at least one monomer M1.1, selected from $C_2$-$C_{10}$-alkyl esters of acrylic acid; and
at least one monomer M1.2, selected from styrene and methyl methacrylate and mixtures thereof.

Preference is given to monomer compositions M.a, which comprise less than 20%, in particular not more than 10% by weight, especially not more than 5% by weight, based on the total amount of monomers in the monomer composition M.a, of monovinyl aromatic monomers. In particular, the composition M.a does not contain vinyl aromatic monomers at all.

Therefore, in a preferred group of embodiments the monomers M1 in the monomer composition M.a are a combination consisting of
at least one monomer M1.1, selected from $C_1$-$C_{20}$-alkyl esters of acrylic acid and $C_5$-$C_{20}$-alkylesters of methacrylic acid and mixtures thereof; and
at least one monomer M1.2, selected from $C_1$-$C_4$-alkyl esters of methacrylic acid monomers and mixtures thereof.

In particular, the monomers M1 in the monomer composition M.a are a combination of
at least one monomer M1.1, selected from $C_2$-$C_{10}$-alkyl esters of acrylic acid, in particular ethyl acrylate, n-butyl acrylate, n-hexyl acrylate, n-octyl acrylate, 2-ethylhexyl acrylate, 2-propylheptyl acrylate and mixtures thereof, such as for example mixtures of n-butyl acrylate and 2-ethylhexyl acrylate or mixtures of n-butyl acrylate and ethyl acrylate or mixtures of ethyl acrylate, n-butyl acrylate and 2-ethylhexyl acrylate; and
at least one monomer M1.2, selected from $C_1$-$C_4$-alkyl esters of methacrylic acid, in particular methyl methacrylate.

More particularly, the monomers M1 in the monomer composition M.a are a combination of
at least one monomer M1.1, selected from $C_2$-$C_{10}$-alkyl esters of acrylic acid, in particular from ethyl acrylate, n-butyl acrylate, n-hexyl acrylate, n-octyl acrylate, 2-ethylhexyl acrylate, 2-propylheptyl acrylate and mixtures thereof; and at least one monomer M1.2, selected from $C_1$-$C_4$-alkyl esters of methacrylic acid, in particular methyl methacrylate.

If the monomer composition M.a contains a combination of monomers M1.1 and M1.2, the weight ratio of monomers M1.1 to monomers M1.2 may vary in particular from 10:1 to 1:5, more particularly from 5:1 to 1:2, especially from 3:1 to 1:1.5.

With regard to the monomers M2, which may be present in the monomer composition M.a, preference is given to monomers M2.1, M2.3 and M2.4 with particular preference given to monomers M2.3 and especially to AMPS and the salts thereof. Especially, the monomer composition M.a does not contain more than 0.1% by weight or even no monomer M2.1, based on the total amount of monomers in the monomer composition M.a.

The monomer composition M.a may also contain one or more monomers M3. These monomers M3 are preferably selected from the group consisting of monomers M3.1, M3.3, M3.5 and M3.6. The total amount of monomers M3 will generally not exceed 10% by weight, in particular 5% by weight, based on the total amount of monomers in the monomer composition M.a. If a monomer M3.5 is present, its amount will usually not exceed 2% by weight, based on the total amount of monomers in the monomer composition M.a. If a monomer M3.6 is present, its amount will usually not exceed 2% by weight, based on the total amount of monomers in the monomer composition M.a.

According to the invention, the monomer composition M.b contains at least one monomer M1 and from 2 to 20% by weight, preferably from 3 to 20% by weight, in particular from 5 to 18% by weight and especially from 8 to 16% by weight, based on the total amount of monomers in the monomer composition of at least one monomer M2. In particular, the monomer composition M.b consists of a) 80 to 98% by weight, preferably from 80 to 97% by weight, in particular 80 to 95% by weight, especially from 80 to 92% by weight, based on the total weight of the monomers of the monomer composition M.b, of at least one monomer M1, b) 2 to 20% by weight, preferably from 3 to 20% by weight, in particular 5 to 18% by weight, especially from 8 to 16% by weight, based on the total weight of the monomers of the monomer composition M.b, of at least one monomer M2, and optionally c) 0 to 10% by weight, in particular 0 to 5% by weight, based on the total weight of the monomers of the monomer composition M.b, of one more monomers M3.

Preferred monomers M1 in the monomer composition M.a are those mentioned as preferred monomers M1. In particular, the monomers M1 in the monomer composition M.a are selected from the group consisting of $C_2$-$C_{10}$-alkyl esters of acrylic acid,
in particular ethyl acrylate, n-butyl acrylate, tert-butyl acrylate, n-hexyl acrylate, n-octyl acrylate, 2-ethylhexyl acrylate, 2-propylheptyl acrylate and mixtures thereof, such as for example mixtures of n-butyl acrylate and 2-ethylhexyl acrylate or mixtures of n-butyl acrylate and ethyl acrylate or mixtures of ethyl acrylate, n-butyl acrylate, tert-butyl acrylate and 2-ethylhexyl acrylate;

$C_1$-$C_4$-alkyl esters of methacrylic acid,
in particular methyl methacrylate;

monovinyl aromatic monomers, especially styrene.

Preferably, the monomers M1 in the monomer composition M.a are either selected from the group consisting of monomers M1.2 or are a combination of at least one monomer M1.1 as defined herein and at least one monomers M1.2 as defined herein.

Especially, the monomers M1 in the monomer composition M.b are at least one monomer M1.2, selected from styrene and methyl methacrylate; or a combination of at least one monomer M1.1 selected from $C_2$-$C_{10}$-alkyl esters of acrylic acid at least one monomer M1.2, selected from styrene and methyl methacrylate and mixtures thereof.

Preference is given to monomer compositions M.b, which comprise less than 20%, in particular not more than 10% by weight, especially not more than 5% by weight, based on the total amount of monomers in the monomer composition M.b, of monovinyl aromatic monomers. In particular, the composition M.b does not contain vinyl aromatic monomers at all.

Therefore, in a preferred group of embodiments the monomers M1 in the monomer composition M.b are either at least one monomer M1.2, selected from $C_1$-$C_4$-alkyl esters of methacrylic acid monomers and mixtures thereof.

or a combination consisting of at least one monomer M1.1, selected from $C_1$-$C_{20}$-alkyl esters of acrylic acid and $C_5$-$C_{20}$-alkylesters of methacrylic acid and mixtures thereof; and at least one monomer M1.2, selected from $C_1$-$C_4$-alkyl esters of methacrylic acid monomers and mixtures thereof.

In particular, the monomers M1 in the monomer composition M.b are either at least one monomer M1.2, selected from $C_1$-$C_4$-alkyl esters of methacrylic acid, in particular methyl methacrylate.

or a combination of at least one monomer M1.1, selected from $C_2$-$C_{10}$-alkyl esters of acrylic acid, in particular ethyl acrylate, n-butyl acrylate, n-hexyl acrylate, n-octyl acrylate, 2-ethylhexyl acrylate, 2-propylheptyl acrylate and mixtures thereof, such as for example mixtures of n-butyl acrylate and 2-ethylhexyl acrylate or mixtures of n-butyl acrylate and ethyl acrylate or mixtures of ethyl acrylate, n-butyl acrylate and 2-ethylhexyl acrylate; and at least one monomer M1.2, selected from $C_1$-$C_4$-alkyl esters of methacrylic acid, in particular methyl methacrylate.

More particularly, the monomers M1 in the monomer composition M.b are either at least one monomer M1.2, selected from $C_1$-$C_4$-alkyl esters of methacrylic acid, in particular methyl methacrylate.

or a combination of at least one monomer M1.1, selected from $C_2$-$C_{10}$-alkyl esters of acrylic acid, in particular from ethyl acrylate, n-butyl acrylate, n-hexyl acrylate, n-octyl acrylate, 2-ethylhexyl acrylate, 2-propylheptyl acrylate and mixtures thereof; and at least one monomer M1.2, selected from $C_1$-$C_4$-alkyl esters of methacrylic acid, in particular methyl methacrylate.

If the monomer composition M.b contains a combination of monomers M1.1 and M1.2, the weight ratio of monomers M1.1 to monomers M1.2 may vary in particular from 1:1 to 1:120, more particularly from 1:1 to 1:15, especially from 1:2 to 1:10.

With regard to the monomers M2, which may be present in the monomer composition M.b, preference is given to monomers M2.1 and combinations thereof with one or more of monomers selected from the group consisting of monomers M2.3 and M2.4 with particular preference given to combinations with monomers M2.3 and especially to combinations with AMPS and the salts thereof. More preferably, the monomers M2 contained in the monomer composition M.b comprise at least 70% by weight, in particular at least 90% by weight or even 100% by weight of one or more monomers M2.1, based on the total amount of monomers M2 in the monomer composition M.b. Especially, the monomers M2 contained in the monomer composition M.b comprise at least 70% by weight, in particular at least 90% by weight or even 100% by weight of methacrylic acid, based on the total amount of monomers M2 in the monomer composition M.b.

The monomer composition M.b may also contain one or more monomers M3. These monomers M3 are preferably selected from the group consisting of monomers M3.1, M3.3, M3.5 and M3.6. The total amount of monomers M3 will generally not exceed 10% by weight, in particular 5% by weight, based on the total amount of monomers in the monomer composition M.b. If a monomer M3.5 is present, its amount will usually not exceed 2% by weight, based on the total amount of monomers in the monomer composition M.b. If a monomer M3.6 is present, its amount will usually not exceed 2% by weight, based on the total amount of monomers in the monomer composition M.b.

Preferably, the monomers in the monomer compositions M.a and M.b are chosen in a manner that two different polymers result, which are distinct from each other by their glass transition temperature. In other words, if the glass transition temperature of the polymer dispersions is measured, two different glass transition temperatures will be observed.

Preferably, the monomers in the monomer compositions M.a and M.b are chosen in a manner that the polymer particles in the aqueous polymer dispersion of the present invention, comprise
- one polymer phase, which has a glass transition temperature Tg(1) of at most 50° C., in particular at most 40° C., and which is e.g. in the range from −25 to +50° C., in particular in the range from −10 to +40° C.;
- and a second polymer phase, which has a glass transition temperature Tg(2) of at least 50° C., in particular at least 60° C., and which is e.g. in the range from +50 to +180° C., in particular in the range from +60 to +150° C.;

provided that the temperature difference |Tg(2)−Tg(1)| is at least 10° C., in particular at least 20° C., especially at least 40° C.

The glass transition temperatures as referred to herein are the actual glass transition temperatures. The actual glass transition temperature can be determined experimentally by the differential scanning calorimetry (DSC) method according to ISO 11357-2:2013, preferably with sample preparation according to ISO 16805:2003.

The actual glass transition temperature depends from the monomer compositions M.a and M.b, which form the respective polymer phases (1) and (2), respectively, and a theoretical glass transition temperature can be calculated from the monomer composition used in the emulsion polymerization. The theoretical glass transition temperatures are usually calculated from the monomer composition by the Fox equation:

$$1/Tg^t = x_1/Tg_1 + x_2/Tg_2 + \ldots x_n/Tg_n,$$

In this equation $x_a, x_b, \ldots x_n$ are the mass fractions of the monomers 1, 2, ... n and $Tg_1, Tg_1, \ldots Tg_n$ are the actual glass transition temperatures in Kelvin of the homopolymers synthesized from only one of the monomers 1, 2, ... n at a time. The Fox equation is described by T. G. Fox in Bull. Am. Phys. Soc. 1956, 1, page 123 and as well as in Ullmann's Encyclopadie der technischen Chemie [Ullmann's Encyclopedia of Industrial Chemistry], vol. 19, p. 18, 4th ed., Verlag Chemie, Weinheim, 1980. The actual Tg values for the homopolymers of most monomers are known and listed, for example, in Ullmann's Encyclopädie der technischen Chemie [Ullmann's Encyclopedia of Industrial Chemistry], 5th ed., vol. A21, p. 169, Verlag Chemie, Weinheim, 1992. Further sources of glass transition temperatures of homopolymers are, for example, J. Brandrup, E. H. Immergut, Polymer Handbook, 1st Ed., J. Wiley, New York 1966, 2nd Ed. J. Wiley, New York 1975, 3rd Ed. J. Wiley, New York 1989 and 4th Ed. J. Wiley, New York 2004.

Usually, the theoretical glass temperature $Tg^t$ calculated according to Fox as described herein and the experimentally determined glass transition temperature as described herein are similar or even same and do not deviate from each other by more than 5 K, in particular they deviate not more than 2 K. Accordingly, both the actual and the theoretical glass transition temperatures of the polymer phases (1) and (2) can be adjusted by choosing proper monomers $M_1, M_2 \ldots M_n$ and their mass fractions $x_1, x_1, \ldots x_n$ in the monomer composition so to arrive at the desired glass transition temperature Tg(1) and Tg(2), respectively. It is common knowledge for a skilled person to choose the proper amounts of monomers $M_1, M_2 \ldots M_n$ for obtaining a copolymer and/or copolymer phase with the desired glass transition temperature.

The monomer compositions M.a and M.b are preferably chosen such that the theoretical glass transition temperature $Tg^t(a)$ of monomer composition M.a is at least 10° C. lower, in particular at least 20° C. lower and especially at least 40° C. lower than the theoretical glass transition temperature $Tg^t(b)$ of monomer composition M.b. In particular, the theoretical glass transition temperature $Tg^t(a)$ of monomer composition M.a is at most 50° C., in particular at most 40° C., and is e.g. in the range from −25 to +50° C., in particular in the range from −10 to +40° C. Likewise, the monomer composition M.b is chosen such that the theoretical glass transition temperature $Tg^t(b)$ is at least 40° C., preferably at least 50° C., in particular at least 60° C., and is e.g. in the range from +50 to +180° C., in particular in the range from +60 to +150° C. In any case, the difference $Tg^t(b)−Tg^t(a)$ is at least 10° C., in particular at least 20° C., especially at least 40° C.

As pointed out above, the aqueous polymer dispersion of the invention is prepared by a multistage, i.e. a 2-stage aqueous radical emulsion polymerization of the monomers M, in particular by a free-radical emulsion polymerization, where
- in a first polymerization step the monomers of the monomer composition M.a are polymerized under the conditions of an aqueous radical emulsion polymerization and, subsequently,
- in a second polymerization step the monomers of the monomer composition M.b are polymerized under the conditions of an aqueous radical emulsion polymerization in the polymer dispersion obtained in the first polymerization step the presence of a chain transfer agent T.

The radical emulsion polymerization of the first and the second polymerization step can be carried out by analogy to well-known processes of radical emulsion polymerization technology, provided that the second polymerization step is carried out in the presence of a chain transfer agent T.

In general, chain transfer agents are understood to mean compounds that transfer free radicals, thereby stop the growth of the polymer chain or control chain growth in the polymerization and which thus reduce the molecular weight of the resulting polymers. Usually, chain transfer agents possess at least one readily abstractable hydrogen atom. Preferably, the abstractable hydrogen is part of a mercapto group, i.e. a group SH, also termed "thiol group".

The chain transfer agent T is in particular selected from the group consisting of
- $C_1$-$C_{20}$-alkyl esters of SH-substituted $C_2$-$C_6$ alkanoic acids, hereinafter $C_2$-$C_6$ thioalkanoic acids (chain transfer agents T.1), in particular $C_1$-$C_{20}$-alkyl esters of mercaptoacetic acid (=thioglycolic acid), such as methyl thioglycolate, ethyl thioglycolate, n-butyl thioglycolate, n-hexyl thioglycolate, n-octyl thioglycolate, 2-ethylhexyl thioglycolate and n-decyl thioglycolate, and $C_1$-$C_{20}$-alkyl esters of mercaptopropionic acid, such as methyl mercaptopropionate, ethyl mercaptopropionate, n-butyl mercaptopropionate, n-hexyl mercaptopropionate, n-octyl mercaptopropionate, 2-ethylhexyl mercaptopropionate and n-decyl mercaptopropionate;
- $C_1$-$C_{20}$-alkyl mercaptans (chain transfer agents T.2), for example ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and the isomeric compounds thereof, n-octanethiol and the isomeric compounds thereof, n-nonanethiol and the isomeric compounds thereof, n-decanethiol and the isomeric compounds thereof, n-undecanethiol and the isomeric compounds thereof, n-dodecanethiol and the isomeric compounds thereof, n-tridecanethiol and isomeric compounds thereof;
- OH-substituted $C_2$-$C_{20}$-alkyl mercaptans (chain transfer agents T.3), for example 2-hydroxyethanethiol and 2-hydroxypropanethiol;
- aromatic thiols (chain transfer agents T.4), such as benzenethiol, ortho-, meta- or para-methylbenzenethiol, and mixtures thereof.

Examples of further chain transfer agents, which may be used instead of the chain transfer agents T.1 to T.4 or in combination therewith are aliphatic and/or araliphatic halogen compounds, for example n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, but also aliphatic and/or aromatic aldehydes, such as acetaldehyde, propionaldehyde and/or benzaldehyde, hydrocarbons having readily abstractable hydrogen atoms, for example toluene and thiol compounds different from T.1 to T.4, e.g. thiol compounds described in Polymer Handbook, 3rd edition, 1989, J. Brandrup and E. H. Immergut, John Wiley & Sons, section II, pages 133 to 141.

Particular preference is given to chain transfer agents T.1, in particular to $C_4$-$C_{16}$-alkyl esters of SH-substituted $C_2$-$C_4$ alkanoic acids, especially to $C_4$-$C_{16}$-alkyl esters of mercaptoacetic acid and to $C_4$-$C_{16}$-alkyl esters of mercaptopropionic acid and to mixtures thereof.

Preferably, the chain transfer agent T, which is used in the second polymerization step ii) comprises at least 80% by weight, in particular at least 90% by weight or 100% by weight, based on the total weight of chain transfer agent T of a chain transfer agent T.1, in particular a $C_4$-$C_{16}$-alkyl ester of a SH-substituted $C_2$-$C_4$ alkanoic acid, especially a $C_4$-$C_{16}$-alkyl ester of mercaptoacetic acid or a $C_4$-$C_{16}$-alkyl ester of mercaptopropionic acid or a mixture thereof.

The amount of chain transfer agent present in polymerization step ii) is preferably in the range of 0.5 to 5% by weight, in particular in the range from 1 to 4% by weight, based on the total weight of the monomers of the monomer composition M.b.

Principally small amounts of chain transfer agents may also be present in the polymerization step i). However, the amount of chain transfer agent present in step i) will generally be lower than 0.2% by weight, in particular lower than lower than 0.1% by weight, especially lower than 0.05% by weight, based on the total weight of the monomers of the monomer composition M.a. In particular, the emulsion polymerization of step i) is carried out in essential absence of a chain transfer agent, i.e. the amount of chain transfer agent present in step i) will generally be lower than 0.01% by weight or even 0% by weight, based on the total weight of the monomers of the monomer composition M.a.

The aqueous radical emulsion polymerization is usually performed in the presence of one or more suitable surfactants. These surfactants typically comprise emulsifiers and provide micelles in which the polymerization occurs, and which serve to stabilize the monomer droplets during aqueous emulsion polymerization and also growing polymer particles. The surfactants used in the emulsion polymerization are usually not separated from the polymer dispersion, but remain in the aqueous polymer dispersion obtainable by the emulsion polymerization of the monomers M.

The surfactant may be selected from emulsifiers and protective colloids. Protective colloids, as opposed to emulsifiers, are understood to mean polymeric compounds having molecular weights above 2000 Daltons, whereas emulsifiers typically have lower molecular weights. The surfactants may be anionic or nonionic or mixtures of non-ionic and anionic surfactants.

Anionic surfactants usually bear at least one anionic group, which is selected from phosphate, phosphonate, sulfate and sulfonate groups. The anionic surfactants, which bear at least one anionic group, are typically used in the form of their alkali metal salts, especially of their sodium salts or in the form of their ammonium salts.

Preferred anionic surfactants are anionic emulsifiers, in particular those, which bear at least one sulfate or sulfonate group. Likewise, anionic emulsifiers, which bear at least one phosphate or phosphonate group may be used, either as sole anionic emulsifiers or in combination with one or more anionic emulsifiers, which bear at least one sulfate or sulfonate group.

Examples of anionic emulsifiers, which bear at least one sulfate or sulfonate group, are, for example,
- the salts, especially the alkali metal and ammonium salts, of alkyl sulfates, especially of $C_8$-$C_{22}$-alkyl sulfates, the salts, especially the alkali metal and ammonium salts, of sulfuric monoesters of ethoxylated alkanols, especially of sulfuric monoesters of ethoxylated $C_8$-$C_{22}$-alkanols, preferably having an ethoxylation level (EO level) in the range from 2 to 40, the salts, especially the alkali metal and ammonium salts, of sulfuric monoesters of ethoxylated alkylphenols, especially of sulfuric monoesters of ethoxylated $C_4$-$C_{18}$-alkylphenols (EO level preferably 3 to 40), the salts, especially the alkali metal and ammonium salts, of alkylsulfonic acids, especially of $C_8$-$C_{22}$-alkylsulfonic acids, the salts, especially the alkali metal and ammonium salts, of dialkyl esters, especially di-$C_4$-$C_{18}$-alkyl esters of sulfosuccinic acid, the salts, especially the alkali metal and ammonium salts, of alkylbenzenesulfonic acids, especially of $C_4$-$C_{22}$-alkylbenzenesulfonic acids, and the salts, especially the alkali metal and ammonium salts, of mono- or disulfonated, alkyl-substituted diphenyl ethers, for example of bis(phenylsulfonic acid) ethers bearing a $C_4$-$C_{24}$-alkyl group on one or both aromatic rings. The latter are common knowledge, for example from U.S. Pat. No. 4,269,749, and are commercially available, for example as Dowfax® 2A1 (Dow Chemical Company).

Also suitable are mixtures of the aforementioned salts.

Preferred anionic surfactants are anionic emulsifiers, which are selected from the following groups:

the salts, especially the alkali metal and ammonium salts, of alkyl sulfates, especially of $C_8$-$C_{22}$-alkyl sulfates, the salts, especially the alkali metal salts, of sulfuric monoesters of ethoxylated alkanols, especially of sulfuric monoesters of ethoxylated $C_8$-$C_{22}$-alkanols, preferably having an ethoxylation level (EO level) in the range from 2 to 40, of sulfuric monoesters of ethoxylated alkylphenols, especially of sulfuric monoesters of ethoxylated $C_4$-$C_{18}$-alkylphenols (EO level preferably 3 to 40), of alkylbenzenesulfonic acids, especially of $C_4$-$C_{22}$-alkylbenzenesulfonic acids, and of mono- or disulfonated, alkyl-substituted diphenyl ethers, for example of bis(phenylsulfonic acid) ethers bearing a $C_4$-$C_{24}$-alkyl group on one or both aromatic rings.

Examples of anionic emulsifiers, which bear a phosphate or phosphonate group, include, but are not limited to the following salts are selected from the following groups:

the salts, especially the alkali metal and ammonium salts, of mono- and dialkyl phosphates, especially $C_8$-$C_{22}$-alkyl phosphates, the salts, especially the alkali metal and ammonium salts, of phosphoric monoesters of $C_2$-$C_3$-alkoxylated alkanols, preferably having an alkoxylation level in the range from 2 to 40, especially in the range from 3 to 30, for example phosphoric monoesters of ethoxylated $C_8$-$C_{22}$-alkanols, preferably having an ethoxylation level (EO level) in the range from 2 to 40, phosphoric monoesters of propoxylated $C_8$-$C_{22}$-alkanols, preferably having a propoxylation level (PO level) in the range from 2 to 40, and phosphoric monoesters of ethoxylated-co-propoxylated $C_8$-$C_{22}$-alkanols, preferably having an ethoxylation level (EO level) in the range from 1 to 20 and a propoxylation level of 1 to 20, the salts, especially the alkali metal and ammonium salts, of phosphoric monoesters of ethoxylated alkylphenols, especially phosphoric monoesters of ethoxylated $C_4$-$C_{18}$-alkylphenols (EO level preferably 3 to 40), the salts, especially the alkali metal and ammonium salts, of alkylphosphonic acids, especially $C_8$-$C_{22}$-alkylphosphonic acids and the salts, especially the alkali metal and ammonium salts, of alkylbenzenephosphonic acids, especially $C_4$-$C_{22}$-alkylbenzenephosphonic acids.

Further suitable anionic surfactants can be found in Houben-Weyl, Methoden der organischen Chemie [Methods of Organic Chemistry], volume XIV/1, Makromolekulare Stoffe [Macromolecular Substances], Georg-Thieme-Verlag, Stuttgart, 1961, p. 192-208.

Preferably, the surfactant comprises at least one anionic emulsifier, which bears at least one sulfate or sulfonate group. The at least one anionic emulsifier, which bears at least one sulfate or sulfonate group, may be the sole type of anionic emulsifiers. However, mixtures of at least one anionic emulsifier, which bears at least one sulfate or sulfonate group, and at least one anionic emulsifier, which bears at least one phosphate or phosphonate group, may also be used. In such mixtures, the amount of the at least one anionic emulsifier, which bears at least one sulfate or sulfonate group, is preferably at least 50% by weight, based on the total weight of anionic surfactants used in the process of the present invention. In particular, the amount of anionic emulsifiers, which bear at least one phosphate or phosphonate group does not exceed 20% by weight, based on the total weight of anionic surfactants used in the process of the present invention.

As well as the aforementioned anionic surfactants, the surfactant may also comprise one or more nonionic surface-active substances, which are especially selected from non-ionic emulsifiers. Suitable nonionic emulsifiers are e.g. araliphatic or aliphatic nonionic emulsifiers, for example ethoxylated mono-, di- and trialkylphenols (EO level: 3 to 50, alkyl radical: $C_4$-$C_{10}$), ethoxylates of long-chain alcohols (EO level: 3 to 100, alkyl radical: $C_8$-$C_{36}$), and polyethylene oxide/polypropylene oxide homo- and copolymers. These may comprise the alkylene oxide units copolymerized in random distribution or in the form of blocks. Very suitable examples are the EO/PO block copolymers. Preference is given to ethoxylates of long-chain alkanols, in particular to those where the alkyl radical $C_8$-$C_{30}$ having a mean ethoxylation level of 5 to 100 and, among these, particular preference to those having a linear $C_{12}$-$C_{20}$ alkyl radical and a mean ethoxylation level of 10 to 50, and also to ethoxylated monoalkylphenols.

In a particular embodiment of the invention, the surfactants used in the process of the present invention comprise less than 20% by weight, especially not more than 10% by weight, of nonionic surfactants, based on the total amount of surfactants used in the process of the present invention, and especially do not comprise any nonionic surfactant. In another embodiment of the invention, the surfactants used in the process of the present invention comprise at least one anionic surfactant and at least one non-ionic surfactant, the ratio of anionic surfactants to non-ionic surfactants being usually in the range from 0.5:1 to 10:1, in particular from 1:1 to 5:1.

Preferably, the surfactant will be used in such an amount that the amount of surfactant is in the range from 0.2 to 5% by weight, especially in the range from 0.3 to 3% by weight, based on the monomers M to be polymerized. Preferably, in stages i) and ii) the surfactant will be used in such an amount that the amount of surfactant is in the range from 0.2 to 5% by weight, especially in the range from 0.3 to 3% by weight, based on the monomers in monomer compositions M.a and M.b, respectively.

The free-radically initiated aqueous emulsion polymerization is triggered by means of a free-radical polymerization initiator (free-radical initiator). These may in principle be peroxides or azo compounds. Of course, redox initiator systems are also useful. Peroxides used may, in principle, be inorganic peroxides, such as hydrogen peroxide or peroxodisulfates, such as the mono- or di-alkali metal or ammonium salts of peroxodisulfuric acid, for example the mono- and disodium, -potassium or ammonium salts, or organic peroxides such as alkyl hydroperoxides, for example tert-butyl hydroperoxide, p-menthyl hydroperoxide or cumyl hydroperoxide, and also dialkyl or diaryl peroxides, such as di-tert-butyl or di-cumyl peroxide. Azo compounds used are essentially 2,2'-azobis(isobutyronitrile), 2,2'-azobis(2,4-di methylvaleronitrile) and 2,2'-azobis(amidinopropyl) dihydrochloride (AlBA, corresponds to V-50 from Wako Chemicals). Suitable oxidizing agents for redox initiator systems are essentially the peroxides specified above. Corresponding reducing agents which may be used are sulfur compounds with a low oxidation state, such as alkali metal sulfites, for example potassium and/or sodium sulfite, alkali metal hydrogensulfites, for example potassium and/or sodium hydrogensulfite, alkali metal metabisulfites, for example potassium and/or sodium metabisulfite, formaldehydesulfoxylates, for example potassium and/or sodium formaldehydesulfoxylate, alkali metal salts, specifically potassium and/or sodium salts of aliphatic sulfinic acids and alkali metal hydrogensulfides, for example potassium and/or sodium hydrogensulfide, salts of polyvalent metals, such as iron(II) sulfate, iron(II) ammonium sulfate, iron(II) phosphate, ene diols, such as dihydroxymaleic acid, benzoin and/or ascorbic acid, and reducing saccharides, such as sorbose, glucose, fructose and/or dihydroxyacetone.

Preferred free-radical initiators are inorganic peroxides, especially peroxodisulfates.

In general, the amount of the free-radical initiator used, based on the total amount of monomers M, is 0.05 to 5 pphm, preferably 0.1 to 2 pphm, based on the total amount of monomers M. Preferably, in stage i) the free-radical initiator will be used in such an amount that the amount of free-radical initiator is in the range from 0.05 to 2 pphm, preferably 0.1 to 1 pphm, based on the monomers in monomer compositions M.a. Preferably, in stage ii) the free-radical initiator will be used in such an amount that the amount of free-radical initiator is in the range from 0.2 to 5 pphm, preferably 0.3 to 2 pphm, based on the monomers in monomer compositions M.b.

The amount of free-radical initiator required in in step i) for the emulsion polymerization of monomers M.a can be initially charged in the polymerization vessel completely. However, it is also possible to charge none of or merely a portion of the free-radical initiator, for example not more than 30% by weight, especially not more than 20% by weight, based on the total amount of the free-radical initiator required in step i) and then to add the entire amount or any remaining residual amount of free-radical initiator under polymerization conditions. Addition may be done according to the consumption, batchwise in one or more portions or continuously with constant or varying flow rates during the free-radical emulsion polymerization of the monomers M.b.

The amount of free-radical initiator required in in step ii) for the emulsion polymerization of monomers M.b can be initially charged in the polymer dispersion obtained in step i) completely. However, it is also possible to charge none of or merely a portion of the free-radical initiator, for example not more than 30% by weight, especially not more than 20% by weight, based on the total amount of the free-radical initiator required in step ii) and then to add the entire amount or any remaining residual amount of free-radical initiator under polymerization conditions. Addition may be done according to the consumption, batchwise in one or more portions or continuously with constant or varying flow rates during the free-radical emulsion polymerization of the monomers M.b. It is also possible to add the amount of free-radical of free-radical initiator required in in step ii) already before the polymerization of step i) is started and then successively add the monomer compositions M.a and M.b under polymerization conditions by the monomer feed method as described below.

Preferably, the radical emulsion polymerization of the monomers M.a is performed by a so-called feed process (also termed monomer feed method), which means that at least 80%, in particular at least 90% or the total amount of the monomers in the monomer composition M.a to be polymerized in step i) are metered to the polymerization reaction under polymerization conditions during a metering period P(i). The duration of the period P(i) may depend from the production equipment and may vary from e.g. 20 minutes to 12 h. Frequently, the duration of the period P(i) will be in the range from 0.5 h to 5 h, especially from 1 h to 4 h.

Preferably, the major portion, i.e. at least 80% of the surfactant used in step i) is added to the emulsion polymerization of step i) in parallel to the addition of the monomer composition M.a. In particular, the monomers are added as an aqueous emulsion to the polymerization reaction, which contains at least at least 80% of the surfactant used in step i).

Generally, the term "polymerization conditions" is understood to mean those temperatures and pressures under which the free-radically initiated aqueous emulsion polymerization proceeds at sufficient polymerization rate. They depend particularly on the free-radical initiator used. Advantageously, the type and amount of the free-radical initiator, polymerization temperature and polymerization pressure are selected such that a sufficient amount of initiating radicals is always present to initiate or to maintain the polymerization reaction.

It may be suitable to establish the polymerization conditions and initially to charge at least a portion of the free-radical initiator into the polymerization vessel before the metering of the monomer composition M.a is started.

It has been found advantageous to perform the free-radical emulsion polymerization of the monomer composition M.a in the presence of a seed latex. A seed latex is a polymer latex which is present in the aqueous polymerization medium before the polymerization of monomers M.a is started. The seed latex may help to better adjust the particle size or the final polymer latex obtained in the free-radical emulsion polymerization of the invention.

Principally every polymer latex may serve as a seed latex. For the purpose of the invention, preference is given to seed latices, where the particle size of the polymer particles is comparatively small. In particular, the Z average particle diameter of the polymer particles of the seed latex, as determined by dynamic light scattering (DLS) at 20° C. (see below) is preferably in the range from 10 to 80 nm, in particular from 10 to 50 nm. Preferably, the polymer particles of the seed latex is made of ethylenically unsaturated monomers, which comprise at least 95% by weight, based on the total weight of the monomers forming the seed latex, of one or more monomers M1.1 and/or M1.2 as defined above. The polymer particles of the seed latex in particular comprise at least 95% by weight, based on the total weight of the monomers forming the seed latex, of at least one monomer M1.2 or of a mixture of at least one monomer M1.2 and one or more monomers M1.1, where the proportion of monomers M1.2 and M1.1 is at least 50%, in particular at least 80% by weight or at least 90% by weight, based on the total weight of the monomers forming the seed latex.

For this, the seed latex is usually charged into the polymerization vessel before the polymerization of the monomers M.a is started. In particular, the seed latex is charged into the polymerization vessel followed by establishing the polymerization conditions, e.g. by heating the mixture to polymerization temperature. It may be beneficial to charge at least a portion of the free-radical initiator into the polymerization vessel before the addition of the monomers M.a is started. However, it is also possible to add the monomers M.a and the free-radical polymerization initiator in parallel to the polymerization vessel.

The amount of seed latex, calculated as solids, may frequently be in the range from 0.1 to 5% by weight, in particular from 0.2 to 3% by weight, based on the total weight of the monomers in the monomer composition M.a to be polymerized.

According to the invention, step ii) is carried out subsequent to step i). Step ii) may be carried out immediately after the monomer composition M.a has been completely added to the emulsion polymerization of step i), i.e. the polymerization of monomers M.b is immediately started after the addition of monomers M.a has been completed. However, it is also possible or preferred to allow the polymerization of step i) to continue after the addition of monomers M.a has been completed, before the polymerization of monomers M.b is started. Frequently, the time period between the completion of the addition of monomers M.a and the start of the polymerization of the monomers M.b will not exceed 60 minutes and is frequently in the range from 5 to 60 minutes.

In step ii) the monomers M.b may be added all at once to the polymer dispersion obtained in step i). However, the radical emulsion polymerization of the monomers M.b is preferably performed by a feed process as described for step i. This means that at least 80%, in particular at least 90% or the total amount of the monomers in the monomer composition M.b to be polymerized in step ii) are metered to the polymerization reaction under polymerization conditions during a metering period P(ii). The duration of the period P(ii) may depend from the production equipment and may vary from e.g. 10 minutes to 8 h. Frequently, the duration of the period P(ii) will be in the range from 0.2 h to 4 h, especially from 0.3 h to 3 h.

In step ii) the monomers M.b are polymerized in the presence of a chain transfer agent. The chain transfer agent T may be added all at once to the polymer dispersion obtained in step i). However, a major portion, preferably at least 80%, in particular at least 90% or the total amount of the chain transfer agent present in step ii) are metered to the polymerization reaction under polymerization conditions during the metering period P(ii).

Preferably, the major portion, in particular at least 80% of the surfactant used in step ii) is added to the emulsion polymerization of step ii) in parallel to the addition of the monomer composition M.b. In particular, the monomers are added as an aqueous emulsion to the polymerization reaction, which contains at least 80% of the surfactant used in step ii). Preferably, the aqueous emulsion of the monomers M.b also contain the major portion, in particular at least 80% of the chain transfer agent T present in step ii).

The free-radical aqueous emulsion polymerization of the invention, i.e. of steps i) and ii) can be conducted at temperatures in the range from 0 to 170° C. Temperatures employed are generally in the range from 50 to 120° C., frequently 60 to 120° C. and often 70 to 110° C. The free-radical aqueous emulsion polymerization of the invention can be conducted at a pressure of less than, equal to or greater than 1 atm (atmospheric pressure), and so the polymerization temperature may exceed 100° C. and may be up to 170° C. Polymerization of the monomers is normally performed at ambient pressure but it may also be performed under elevated pressure. In this case, the pressure may assume values of 1.2, 1.5, 2, 5, 10, 15 bar (absolute) or even higher values. If emulsion polymerizations are conducted under reduced pressure, pressures of 950 mbar, frequently of 900 mbar and often 850 mbar (absolute) are established.

Advantageously, the free-radical aqueous emulsion polymerization of the invention is conducted at ambient pressure (about 1 atm) with exclusion of oxygen, for example under an inert gas atmosphere, for example under nitrogen or argon.

The free-radical emulsion polymerization of the invention is usually effected in an aqueous polymerization medium, which, as well as water, comprises at least one surface-active substance, so-called surfactants, for stabilizing the emulsion of the monomers and the polymer particles of the polymer latex. Suitable surfactants are mentioned hereinabove.

Apart from that, the conditions required for the performance of the radical emulsion polymerization are sufficiently familiar to those skilled in the art, for example from the prior art cited at the outset and from "Emulsionspolymerization" [Emulsion Polymerization] in Encyclopedia of Polymer Science and Engineering, vol. 8, pages 659 ff. (1987); D. C. Blackley, in High Polymer Latices, vol. 1, pages 35 ff. (1966); H. Warson, The Applications of Synthetic Resin Emulsions, chapter 5, pages 246 ff. (1972); D. Diederich, Chemie in unserer Zeit 24, pages 135 to 142 (1990); Emulsion Polymerization, Interscience Publishers, New York (1965); DE-A 40 03 422 and Dispersionen synthetischer Hochpolymerer [Dispersions of Synthetic High Polymers], F. Hölscher, Springer-Verlag, Berlin (1969)].

It is frequently advantageous when the aqueous polymer dispersion obtained on completion of polymerization of the monomers M is subjected to an after-treatment to reduce the residual monomer content. This after-treatment is effected either chemically, for example by completing the polymerization reaction using a more effective free-radical initiator system (known as postpolymerization), and/or physically, for example by stripping the aqueous polymer dispersion with steam or inert gas. Corresponding chemical and physical methods are familiar to those skilled in the art—see, for example, EP-A 771328, DE-A 19624299, DE-A 19621027, DE-A 19741184, DE-A 19741187, DE-A 19805122, DE-A 19828183, DE-A 19839199, DE-A 19840586 and DE-A 19847115. The combination of chemical and physical after-treatment has the advantage that it removes not only the unconverted ethylenically unsaturated monomers but also other disruptive volatile organic constituents (VOCs) from the aqueous polymer dispersion.

As the polymer contained in the aqueous polymer dispersion contains acidic groups from the monomers M2 and optionally from the polymerization initiator, the aqueous polymer dispersion obtained by the process of the invention is frequently neutralized prior to formulating it as a coating composition. The neutralization of acid groups of the polymer is achieved by neutralizing agents known to the skilled of the art after polymerization and/or during the polymerization. For example, the neutralizing agent may be added in a joint feed with the monomers to be polymerized, or in a separate feed. Suitable neutralizing agents include organic amines, alkali hydroxides, ammonium hydroxides. In a preferred group of embodiments, no organic amine is used for the neutralization in order to keep the content of organic volatiles, i.e. the VOC as low as possible. In particular neutralization is achieved by using ammonia or alkali hydroxides, such as sodium hydroxide or potassium hydroxide.

Preferably, the final polymer dispersion has a pH of at least pH 8, e.g. in the range of pH 8 to pH 13, prior to the use in the coating composition.

As mentioned above, the aqueous polymer dispersions obtained by the process of the present invention have two different polymer phases. One phase stems from the aqueous radical emulsion polymerization of the monomer composition M.a while the other phase stems from the aqueous radical emulsion polymerization of the monomer composition M.b. Preferably, the glass transition temperatures of these two polymer phases, i.e. Tg(a) and Tg(b) are distinct from each other. In particular, the difference between the glass transition temperature Tg(a) and the glass transition temperature Tg(b) is at least 10° C., in particular at least 20° C., especially at least 40° C. In particular, the glass transition temperature Tg(b) is higher than the glass transition temperature Tg(a).

In particular, the polymer particles in the aqueous polymer dispersion of the present invention, comprise
  one polymer phase, which has a glass transition temperature Tg(a) of at most 50° C., in particular at most 40° C., and which is e.g. in the range from −25 to +50° C., in particular in the range from −10 to +40° C.;
  and a second polymer phase, which has a glass transition temperature Tg(b) of at least 50° C., in particular at least 60° C., and which is e.g. in the range from +50 to +180° C., in particular in the range from +60 to +150° C.;
provided that the temperature difference |Tg(b)−Tg(a)| is at least 10° C., in particular at least 20° C., especially at least 40° C.

For the purposes of the invention it has been found beneficial, if the particles of the polymer contained in the polymer latex have a Z-average particle diameter in the range from 80 to 500 nm, in particular in the range from 100 to 350 nm, as determined by quasi-elastic light scattering.

If not stated otherwise, the size of the particles as well as the distribution of particle size is determined by quasi-elastic light scattering (QELS), also known as dynamic light scattering (DLS). The measurement method is described in the ISO 13321:1996 standard. The determination can be carried out using a High-Performance Particle Sizer (H PPS). For this purpose, a sample of the aqueous polymer latex will be diluted and the dilution will be analyzed. In the context of QELS, the aqueous dilution may have a polymer concentration in the range from 0.001 to 0.5% by weight, depending on the particle size. For most purposes, a proper concentration will be 0.01% by weight. However, higher or lower concentrations may be used to achieve an optimum signal/noise ratio. The dilution can be achieved by addition of the polymer latex to water or an aqueous solution of a surfactant in order to avoid flocculation. Usually, dilution is performed by using a 0.1% by weight aqueous solution of a non-ionic emulsifier, e.g. an ethoxylated C16/C18 alkanol (degree of ethoxylation of 18), as a diluent. Measurement configuration: HPPS from Malvern, automated, with continuous-flow cuvette and Gilson autosampler. Parameters: measurement temperature 20.0° C.; measurement time 120 seconds (6 cycles each of 20 s); scattering angle 173°; wavelength laser 633 nm (HeNe); refractive index of medium 1.332 (aqueous); viscosity 0.9546 mPa·s. The measurement gives an average value of the second order cumulant analysis (mean of fits), i.e. Z average. The "mean of fits" is an average, intensity-weighted hydrodynamic particle diameter in nm.

The hydrodynamic particle diameter can also be determined by hydrodynamic chromatography fractionation (HDC), as for example described by H. Wiese, "Characterization of Aqueous Polymer Dispersions" in Polymer Dispersions and Their Industrial Applications (Wiley-VCH, 2002), pp. 41-73. For further details reference is made to the examples and the description below.

The particle size distribution of the polymer particles contained in the polymer dispersion is in particular monomodal or almost monomodal, which means that the distribution function of the particle size has a single maximum. However, the particle size distribution of the copolymer particles contained in the polymer latex may also be polymodal, in particular bimodal, which means that the distribution function of the particle size has at least two maxima. Preferably, said first maximum is in the range of 50 to 180 nm and said second maximum is in the range of 200 to 400 nm.

The aqueous polymer dispersions obtainable by the process of the present invention generally have solids contents in the range of 30% to 75%, preferably in the range of 40% to 65% by weight, in particular in the range of 45 to 60% by weight.

The present invention also relates to waterborne coating compositions, which contain a polymer dispersion of the present invention as a binder or cobinder. In particular, the present invention also relates to waterborne coating compositions, which contain a polymer dispersion of the present invention as a binder or cobinder and at least one or more ingredients customarily used in waterborne coating compositions. Preferably, the aqueous polymer dispersion of the present invention is the sole binder or its polymer contributes at least 90% by weight to the weight of all binder polymers contained in the waterborne coating composition.

In one group of embodiments of the present invention the aqueous polymer dispersions are used as a binder or cobinder in a transparent varnish. In this case the coating compositions comprise, based on their overall weight, 10% to 60% by weight, preferably 40% to 55% by weight, of the binder polymer and 0.1% to 30% by weight, preferably 0.5% to 10% by weight, of customary auxiliaries, which are in particular selected from the group consisting of defoamers, film-forming assistants, thickeners and preservatives and combinations thereof. In this group of embodiments, the polymer of the aqueous polymer dispersion of the invention contributes at least 90 by weight to the total mass of binder polymers in the transparent varnish.

In another embodiment of the present invention, the aqueous polymer dispersions are used as a binder or cobinder in pigmented and/or filled waterborne coating composition, which is also termed a waterborne paint formulation. In this group of embodiments, the polymer of the aqueous polymer dispersion of the invention contributes at least 90 by weight to the total mass of binder polymers in the paint formulation.

In the waterborne paint formulation the total polymer content is in the range from 5 to 50% by weight, in particular in the range from 10 to 40% by weight, based on the total weight of the paint formulation and the total amount of fillers and/or pigments is in the range from 10% to 90% by weight, in particular 20 to 80% by weight more preferably from 30 to 70% by weight and especially from 40 to 60% by weight, based on the total weight of the waterborne paint formulation.

Pigments for the purposes of the present invention are virtually insoluble, finely dispersed, organic or preferably inorganic colorants as per the definition in German standard specification DIN 55944:2003-11. Examples of pigments are in particular inorganic pigments, such as white pigments like titanium dioxide (C.I. Pigment White 6), but also color pigments, e.g.

- black pigments, such as iron oxide black (C.I. Pigment Black 11), iron manganese black, spinel black (C.I. Pigment Black 27), carbon black (C.I. Pigment Black 7);
- color pigments, such as chromium oxide, chromium oxide hydrate green; chrome green (C.I. Pigment Green 48); cobalt green (C.I. Pigment Green 50); ultramarine green; cobalt blue (C.I. Pigment Blue 28 und 36); ultramarine blue, iron blue (C.I. Pigment Blue 27), manganese blue, ultramarine violet, cobalt violet, manganese violet, iron oxide read (C.I. Pigment Red 101); cadmium sulfoselenide (C.I. Pigment Red 108); molybdate read (C.I. Pigment Red 104); ultramarine read,
- iron oxide brown, mixed brown, spinel- and Korundum phases (C.I. Pigment Brown 24, 29 und 31), chrome orange;
- iron oxide yellow (C.I. Pigment Yellow 42); nickel titanium yellow (C.I. Pigment Yellow 53; C.I. Pigment Yellow 157 und 164); chrome titanium yellow; cadmium sulfide und cadmium zinc sulfide (C.I. Pigment Yellow 37 und 35); Chrome yellow (C.I. Pigment Yellow 34), zinc yellow, alkaline earth metal chromates; Naples yellow; bismuth vanadate (C.I. Pigment Yellow 184);
- Interference pigments, such as metallic effect pigments based on coated metal platelets, pearl luster pigments based on mica platelets coated with metal oxide, and liquid crystal pigments.

The waterborne coating compositions may also contain one or more fillers. Examples of suitable fillers are aluminosilicates, such as feldspars, silicates, such as kaolin, talc, mica, magnesite, alkaline earth metal carbonates, such as calcium carbonate, for example in the form of calcite or chalk, magnesium carbonate, dolomite, alkaline earth metal sulfates, such as calcium sulfate, silicon dioxide, etc. In the coating compositions of the invention, finely divided fillers are naturally preferred. The fillers may be used in the form of individual components. In practice, however, filler mixtures have been found to be particularly useful, for example calcium carbonate/kaolin, calcium carbonate/talc. Gloss paints generally comprise only small amounts of very finely divided fillers or do not comprise any fillers. Fillers also include flatting agents which significantly impair the gloss as desired. Flatting agents are generally transparent and may be either organic or inorganic. Examples of flatting agents are inorganic silicates, for example the Syloid® brands from W. R. Grace & Company and the Acematt® brands from Evonik GmbH. Organic flatting agents are obtainable, for example, from BYK-Chemie GmbH under the Ceraflour® brands and the Ceramat® brands, and from Deuteron GmbH under the Deuteron MK® brand.

The proportion of the pigments and fillers in the waterborne coating compositions can be described in a manner known per se via the pigment volume concentration (PVC). The PVC describes the ratio of the volume of pigments (VP) and fillers (VF) relative to the total volume, consisting of the volumes of binder (VB), pigments (VP) and fillers (VF) in a dried coating film in percent: PVC=(VP+VF)×100/(VP+VF+VB).

The beneficial effects of the polymer dispersion are especially manifested in the case of waterborne paint formulations having a PVC of at least 5. Preferably, the PVC will not exceed a value of 60 and is specifically in the range from 5 to 50. However, the inventive effects of the polymer dispersions are also manifested in varnishes which typically have a pigment/filler content below 5% by weight, based on the varnish, and correspondingly have a PVC below 5.

Preferably, the waterborne coating compositions of the invention are formulated in a manner that their VOC, as determined in accordance with DIN ISO 11890-2:2013-07, is below 1000 ppm, e.g. by using suitable additives, which do not contribute to the VOC.

Apart from that, the waterborne paint formulation may contain auxiliaries conventionally used in waterborne paint formulations. The total amount of auxiliaries is frequently in the range from 0.1% to 30% by weight and preferably in the range from 0.5 to 10% by weight, based on the total weight of the paint formulation. Conventional auxiliaries include, but are not limited to pigment dispersants, wetting agents, rheology modifying agents, filming auxiliaries, also termed coalescents, leveling agents, biocides, defoamers and combinations thereof. Further suitable auxiliaries and components are e.g. described by J. Bieleman in "Additives for Coatings", Whiley-VCH, Weinheim 2000; by T. C. Patton in "Paint Flow and Pigment Dispersions", 2. Edition, John Whiley & Sons 1978; and by M. Schwartz and R. Baumstark in "Water based Acrylates for Decorative Coatings", Curt R. Vincentz Verlag, Hanover 2001.

Preferably, the waterborne coating compositions comprise at least one aqueous polymer dispersion as defined herein, and further comprises a rheology modifying agent. Suitable rheology modifying agents include associative thickener polymers and non-associative rheology modifiers. The aqueous liquid composition preferably comprises a thickening agent selected from the group consisting of associative thickeners and optionally a non-associative thickener.

Associative thickener polymers are well known and frequently described in the scientific literature, e.g. by E. J. Schaller et al., "Associative Thickeners" in Handbook of Coating Additives, Vol. 2 (Editor L. J. Calbo), Marcel Decker 192, pp. 105-164, J. Bieleman "PUR-Verdicker" in Additives for Coatings (Editor J. Bielemann), Wiley 2000, pp 50-58. NiSAT thickener polymers of the HEUR and HMPE type are also described in the patent literature, such as U.S. Pat. Nos. 4,079,028, 4,155,892, EP 61822, EP 307775, WO 96/31550, EP 612329, EP 1013264, EP 1541643, EP 1584331, EP 2184304, DE 4137247, DE 102004008015, DE 102004031786, US 2011/0166291 and WO 2012/052508. Apart from that, associative thickener polymers are commercially available.

The associative thickener polymers include anionic, acrylate type thickener polymers, so-called HASE polymers (hydrophobically modified polyacrylate thickeners), which are copolymers of acrylic acid and alkyl acrylate monomers, where the alkyl group of the alkyl acrylate may have from 6 to 24 carbon atoms. The associative thickener polymers also include non-ionic associative thickeners, so called NiSAT thickeners (non-ionic synthetic associative thickeners), which usually are linear or branched block copolymers having at least one interior hydrophilic moiety, in particular a polyether moiety, especially at least one polyethylene oxide moiety and two or more terminal hydrocarbon groups each having at least 4 carbon atoms, in particular from 4 to 24 carbon atoms, e.g. a linear or branched alkyl radical having 4 to 24 carbon atoms or alkyl substituted phenyl having 7 to 24 carbon atoms. NiSAT thickeners include the hydrophobically modified polyethylene oxide urethane rheology modifiers, also termed HEUR or PUR thickeners, and hydrophobically modified polyethyleneoxides, which are also termed HMPE.

The amount of the associative thickener polymer will depend on the desired viscosity profile and is frequently in the range from 0.05 to 2.5% by weight, in particular 0.1 to 2% by weight of thickener, and especially 0.2 to 2% by weight, based on the latex paint.

Suitable non-associative rheology modifiers are in particular cellulose based thickeners, especially hydroxyethyl cellulose, but also thickeners based on acrylate emulsions (ASE). Amongst the non-associative rheology modifiers preference is given to non-associative cellulose based thickeners.

The total amount of the thickener polymer will depend on the desired viscosity profile and is frequently in the range from 0.05 to 2.5% by weight, in particular 0.1 to 2% by weight of thickener, and especially 0.15 to 1.5% by weight, based on the latex paint.

The waterborne coating compositions of the invention may also comprise customary auxiliaries. The customary auxiliaries will depend from the kind of the coating in a well-known manner and include but are not limited to:
wetting agents or dispersants,
filming auxiliaries, also termed coalescents,
leveling agents,
biocides and
defoamers.

Suitable wetting agents or dispersants are, for example, sodium polyphosphates, potassium polyphosphates or ammonium polyphosphates, alkali metal salts and ammonium salts of acrylic acid copolymers or maleic anhydride copolymers, polyphosphonates, such as sodium 1-hydroxyethane-1,1-diphosphonate, and naphthalenesulfonic salts, especially the sodium salts thereof.

Suitable filming auxiliaries are solvents and plasticizers. Plasticizers, in contrast to solvents, have a low volatility and preferably have a boiling point at 1013 mbar of higher than 250° C., while solvents have a higher volatility than plasticizers and preferably have a boiling point at 1013 mbar of less than 250° C. Suitable filming auxiliaries are, for example, white spirit, pine oil, propylene glycol, ethylene glycol, butyl glycol, butyl glycol acetate, butyl glycol diacetate, butyl diglycol, butylcarbitol, 1-methoxy-2-propanol, 2,2,2-trimethyl-1,3-pentanediol monoisobutyrate (Texanol®) and the glycol ethers and esters, commercially available, for example, from BASF SE under the Solvenon® and Lusolvan® and Loxanol® names, and from Dow under the Dowanol® trade name. The amount is preferably <5% by weight and more preferably <1% by weight, based on the overall formulation. Formulation is also possible completely without filming auxiliaries. If the coating compositions contain filming auxiliaries, these are preferably selected from plasticizers. Frequently, the coating compositions do not require any filming auxiliaries.

The waterborne coating compositions of the invention preferably do not contain any volatile organic compound. In case that volatile organic compounds are present, the concentration of said compounds is usually below 0.2 wt.-%, preferably below 0.1 wt.-30%, more preferably below 0.05 wt.-%, based on the total amount of the waterborne coating composition. A volatile compound in terms of the invention is a compound, which has a boiling point at 1013 mbar of less than 250° C.

The present invention also relates to the use of the waterborne coating compositions of the present invention for coating substrates and accordingly to a method for producing a coating on a surface. The method comprises
(a) applying the waterborne coating composition according to the invention to a surface to be coated, and
(b) allowing the composition to dry to produce the coating.

The waterborne coating compositions can be applied to surfaces and/or substrates to be coated in a customary manner such as for example by applying the paint with brushes or rolls, by spraying, by dipping, by rolling, or by bar coating. The coating of surfaces and/or substrates is effected in such a way that the surface and/or substrate is first coated with a composition of the invention and then the aqueous composition is subjected to a drying step, especially within the temperature range of $\geq -10$ and $\leq +50°$ C., advantageously $\geq +5$ and $\leq +40°$ C. and especially advantageously $\geq +10$ and $\leq +35°$ C.

Principally the waterborne coating compositions of the present invention can be applied to any substrate, which is conventionally coated by waterborne coating compositions. The waterborne coating compositions can be applied to surfaces such as for example metal, asphalt, concrete, fiber cement boards, stone, ceramic, minerals, wood, plastic, polymer, and glass. The waterborne coating compositions can be applied to interior or exterior surfaces such as for example an architectural surface such as a roof, a wall, a floor, and a ceiling. Preferably, the waterborne coating compositions are applied to exterior surfaces.

The waterborne coating compositions of the present invention are particularly suitable for coating of mineral substrates including stone walls and especially suitable for coating cement bound mineral substrates, including concrete surfaces, such as concrete roof tiles, and fiber cement boards.

EXAMPLES

Hereinafter the following abbreviations were used:
AMPS: 2-acrylamido-2-methylpropane sulfonic acid
% b.w. % by weight
BDG: Butyl diglycol
CTA: Chain transfer agent
DLS: Dynamic light scattering
SOR: Soiling resistance
DV Dynamic viscosity
EO: Ethylene oxide
HDC: Hydrodynamic chromatography
HDC-PS: Particle size determined by HDC
HPPS: High Performance Particle Sizer
MAA: Methacrylic acid
MFFT: Minimum film forming temperature
n.d. not determined
n.o. not observed
PDI: Polydispersity index
rpm: rotations per minute
SLS: Sodium lauryl sulfate
SC: Solids content
Tg: Glass transition temperature WU: Water uptake Z-PS: Particle size determined by DLS 1. Analytics and characterization 1.1 Characterization of the dispersions i) Solids contents of the polymer dispersions were measured according to the standard method DIN EN ISO 3251: 2008-06.

ii) pH values of the polymer dispersions were measured according to the standard method DIN EN 1262:2004-01.

iii) Dynamic viscosity was measured in cP according to the standard method DIN ISO 1652:2013-02 using a Rheomat with spindle 3 at 100 rpm.

iv) The glass transition temperature was determined by the DSC method (Differential Scanning calorimetry, 20 K/min, midpoint measurement, DIN 53765:1994-03) by means of a DSC instrument (Q 2000 series from TA instruments).

v) Particle Size Distribution of Polymer Dispersion by DLS

The particle diameter of the polymer latex was determined by dynamic light scattering (also termed quasi-elastic light scattering) of an aqueous polymer dispersion diluted with deionized water to 0.001 to 0.5% by weight at 22° C. by means of a HPPS from Malvern Instruments, England. What is reported is the cumulant Z average diameter calculated from the measured autocorrelation function (ISO Standard 13321). The polydispersity index was calculated from a simple 2 parameter fit to the correlation data (the cumulants analysis).

vi) Particle Size Distribution of Polymer Dispersion by HDC

Measurements were carried out using a PL-PSDA particle size distribution analyzer (Polymer Laboratories, Inc.). A small amount of sample of the polymer latex was injected into an aqueous eluent containing an emulsifier, resulting in a concentration of approximately 0.5 g/l. The mixture was pumped through a glass capillary tube of approximately 15 mm diameter packed with polystyrene spheres. As determined by their hydrodynamic diameter, smaller particles can sterically access regions of slower flow in capillaries, such that on average the smaller particles experience slower elution flow. The fractionation was finally monitored using an UV-detector which measured the extinction at a fixed wavelength of 254 nm.

vii) The minimum film forming temperature (MFFT) was determined in accordance with DIN ISO 2115:2001-04 using a Kofler heating bank.

1.2 Application Testing:

i. Measurement of the maximum crack-free film thickness (also called mud-cracking test): A paint sample was applied into a wedge (characterized in such a way that the deepness of the wedge varies from 0 to 2400 µm) and dried for 1 day at 25° C. The maximum crack-free film thickness corresponds to the maximum film thickness, at which cracking starts at the surface of the paint film. The start of the cracking was assessed visually.

ii. Pendulum hardness (according to Konig 3°) was measured according to DIN EN ISO 1522:2007-04, respectively, using the following protocols:

(a) Clear film: The respective latex is applied as a 100 µm (wet) film and the film is dried for 1 day at 25° C. The pendulum hardness is measured in terms of seconds until the pendulum stops swinging.

(b) Paint film: A 240 µm (wet) dispersion film was applied on a glass plate and dried for 1 day at 25° C. (if the paint does not contain any coalescents) or 3 days at 25° C. (if the paint contains coalescents). The pendulum hardness was measured in terms of seconds until the pendulum stopped swinging.

iii. Measurement of gloss: The gloss of the film was measured using the standard method DIN 53778-1: 1983-08. A 100 µm (wet) film of the paint was applied with a doctor blade on glass and dried for 1 day. The gloss was then measured with a gloss meter.

iv. Measurement of the water uptake #1: The measurement was carried out according to DIN EN ISO 62:2008-05 (procedure 3): The paint sample was applied in a Teflon mold (to achieve a 1000 µm (wet) thick paint film) and left drying (for 2 days in the mold followed by 26 days after removal from the mold). After drying of the film, 3 pieces of the film were cut, weighed with an analytical balance, immersed in water for 24 h, wiped dry and finally weighed again to calculate the water absorption of the film.

v. Water uptake #2: the paint sample was applied on a Teflon foil with a 600 µm doctor blade and left drying for 1 day at 25° C. After drying of the film, 2 pieces of the film (4 cm*5 cm) were cut, dried 2 days in the oven at 60° C., weighed with an analytical balance, immersed in water for 72 h, wiped dry and finally weighed once again to calculate the water absorption of the film.

vi. Soiling resistance: the paint sample was applied on a glass plate with a doctor blade (200 µm wet) and dried for 24 h at 25° C. L values of the samples were measured by means of a CIEL*a*b* measuring/metering device according to ISO 7724-2:1984-10 after drying to obtain a reference L value L0. The sample was heated to 80° C., activated carbon was poured on the first half of the paint sample. The paint sample was cooled down to 25° C. and the second half of the paint sample was treated with activated carbon. The excess of activated carbon was removed by applying water on the paint sample and the L value was once again measured on both half's of the paint samples. Herein, L1 is L value of the plate exposed to activated carbon at 80° C., while L2 is the L value of the plate exposed to activated carbon at 25° C. The soiling was calculated with the following equation:

Soiling at 80° C.=L1/L0−100

Soiling at 25° C.=L2/L0−100

2. Materials used for preparing the polymer dispersions

Seed latex S1: Polystyrene seed latex having a solid content of 33% by weight and a volume average particle diameter of 10 to 50 nm.

Emulsifier E1: 15% b.w. aqueous solution of sodium dodecylsulfate

Emulsifier E2: 28% b.w. aqueous solution of the sodium salt of a C12 fatty alcohol ether sulfate having about 1 to 2.5 EO units;

Emulsifier E3: 20% b.w. aqueous solution of an ethoxylated C16/C18 alcohol having 18 EO units Defoaming agent D1: TEGO Foamex LAE 511

If not stated otherwise, the water used in the production examples was deionized water.

3. Production of Polymer Dispersions

Example 1: (Comparative)

A polymerization reactor equipped with a temperature control module and a dosing module was charged as followed:

Initial charge #1

| 616.69 g | water |
| 18.18 g | seed latex S1 |

Initial charge #2:
1.54 g 7% b.w. aqueous solution of sodium peroxodisulfate

In the first addition vessel was prepared feed #1 by using the following components:

Feed/emulsion #1:

| 91.51 g | water |
| 8.00 g | emulsifier E1 |
| 14.14 g | emulsifier E2 |
| 12.0 g | 2-ethylhexyl thioglycolate |
| 58.69 g | n-butyl acrylate |
| 265.25 g | methyl methacrylate |
| 36.00 g | methacrylic acid |
| 87.49 g | water (rinsing water for emulsion vessel #1) |

In the second addition vessel was prepared feed #2 by using the following components:

Feed/emulsion #2:

| 141.13 g | water |
| 16.00 g | emulsifier E1 |
| 28.72 g | emulsifier E2 |
| 14.70 g | 50% aqueous solution of AMPS |
| 339.64 g | methyl methacrylate |
| 493.00 g | n-butyl acrylate |
| 87.48 g | water (rinsing water for emulsion vessel #2) |

In the third addition vessel was prepared the following mixture:

Feed #3:
19.03 g 7% b.w. aqueous solution of sodium peroxodisulfate

The initial charge #1 was heated up to polymerization temperature of 85° C. under stirring with 150 rpm. Initial charge #2 was then added to the initial charge #1. The additions of feed #3 and emulsion #1 were immediately started at the same time. Feed #3 was performed over 130 min semi-continuously since dosing was stopped during 10 min between the addition of emulsion #1 and the addition of emulsion #2. Emulsion #1 was fed continuously into the reactor over 40 min. After the dosing of emulsion #1 was completed, the dosing of feed #3 was stopped and the emulsion vessel #1 was rinsed with water. After 10 min of post polymerization, the dosing of emulsion #2 and the rest of feed #3 was started at the same time. Emulsion #2 was fed continuously into the reactor over 90 min. After completion of the feeding of emulsion #2 and feed #3, the emulsion vessel #2 was rinsed with water and the reactor was stirred at 85° C. during 20 min. After the post polymerization was completed, 23.20 g of ammonia (25% solution in water) was added to the reaction mixture, which was then stirred for 15 min. Upon completion of the neutralization step, 0.24 g of defoaming agent D1 was added into the reactor, which was then cooled down to 75° C. and further stirred for 30 min. 109 g of water was then added to the reactor over 10 min and the reaction mixture was further stirred 60 min before cooling down to 25° C.

2482.2 g of the resulting aqueous dispersion was obtained, which virtually did not contain any coagulum. The properties are summarized in table 1.

Example 2

A polymerization reactor equipped with a temperature control module and a dosing module was charged as followed:

Initial charge #1

| 616.69 g | water |
| 18.18 g | seed latex S1 |

Initial charge #2:
1.54 g 7% b.w. aqueous solution of sodium peroxodisulfate

In the first addition vessel was prepared feed #1 by using the following components:

Feed/emulsion #1:

| 141.13 g | water |
| 16.00 g | emulsifier E1 |
| 28.72 g | emulsifier E2 |
| 14.70 g | 50% aqueous solution of AMPS |
| 339.64 g | methyl methacrylate |
| 493.00 g | n-butyl acrylate |
| 87.48 g | water (rinsing water for emulsion vessel #1) |

In the second addition vessel was prepared feed #2 by using the following components:

Feed/emulsion #2:

| 91.51 g | water |
| 8.00 g | emulsifier E1 |
| 14.14 g | emulsifier E2 |
| 12.0 g | 2-ethylhexyl thioglycolate |
| 58.69 g | n-butyl acrylate |
| 265.25 g | methyl methacrylate |
| 36.00 g | methacrylic acid |
| 87.49 g | water (rinsing water for emulsion vessel #2) |

In the third addition vessel was prepared the following mixture:

Feed #3:
19.03 g 7% b.w. aqueous solution of sodium peroxodisulfate

The initial charge #1 was heated up to polymerization temperature of 85° C. under stirring with 150 rpm. Initial charge #2 was then added to the initial charge #1. The additions of feed #3 and emulsion #1 were immediately started at the same time. Feed #3 was performed over 130 min semi-continuously since dosing was stopped during 10 min between the addition of emulsion #1 and the addition of emulsion #2. Emulsion #1 was fed continuously into the reactor over 90 min. After the dosing of emulsion #1 was completed, the dosing of feed #3 was stopped and the emulsion vessel #1 was rinsed with water. After 10 min of post polymerization, the dosing of emulsion #2 and the rest of feed #3 was started at the same time. Emulsion #2 was fed continuously into the reactor over 40 min. After completion of the feeding of emulsion #2 and feed #3, the emulsion vessel #2 was rinsed with water and the reactor was stirred at 85° C. during 20 min. After the post polymerization was completed, 23.20 g of ammonia (25% solution in water) was added to the reaction mixture, which was then stirred for 15 min. Upon completion of the neutralization step, 0.24 g of defoaming agent D1 was added into the reactor, which was then cooled down to 75° C. and further stirred for 30 min. 109 g of water was then added to the reactor over 10 min and the reaction mixture was further stirred 60 min before cooling down to 25° C.

2482.2 g of the resulting aqueous dispersion was obtained, which virtually did not contain any coagulum. The properties are summarized in table 1.

Example 3: (Comparative)

A polymerization reactor equipped with a temperature control module and a dosing module was charged as followed:

Initial charge #1

| 616.69 g | water |
| 18.18 g | seed latex S1 |

Initial charge #2:

1.54 g 7% b.w. aqueous solution of sodium peroxodisulfate

In the first addition vessel was prepared feed #1 by using the following components:

Feed/emulsion #1:

| 91.51 g | water |
| 8.00 g | emulsifier E1 |
| 14.14 g | emulsifier E2 |
| 12.0 g | 2-ethylhexyl thioglycolate |
| 58.69 g | n-butyl acrylate |
| 265.25 g | methyl methacrylate |
| 36.00 g | methacrylic acid |
| 87.49 g | water (rinsing water for emulsion vessel #1) |

In the second addition vessel was prepared feed #2 by using the following components:

Feed/emulsion #2:

| 141.13 g | water |
| 16.00 g | emulsifier E1 |
| 28.72 g | emulsifier E2 |
| 14.70 g | 50% aqueous solution of AMPS |
| 444.54 g | methyl methacrylate |
| 388.11 g | n-butyl acrylate |
| 87.48 g | water (rinsing water for emulsion vessel #2) |

In the third addition vessel was prepared the following mixture:

Feed #3:

19.03 g 7% b.w. aqueous solution of sodium peroxodisulfate

The initial charge #1 was heated up to polymerization temperature of 85° C. under stirring with 150 rpm. Initial charge #2 was then added to the initial charge #1. The additions of feed #3 and emulsion #1 were immediately started at the same time. Feed #3 was performed over 130 min semi-continuously since dosing was stopped during 10 min between the addition of emulsion #1 and the addition of emulsion #2. Emulsion #1 was fed continuously into the reactor over 40 min. After the dosing of emulsion #1 was completed, the dosing of feed #3 was stopped and the emulsion vessel #1 was rinsed with water. After 10 min of post polymerization, the dosing of emulsion #2 and the rest of feed #3 was started at the same time. Emulsion #2 was fed continuously into the reactor over 90 min. After completion of the feeding of emulsion #2 and feed #3, the emulsion vessel #2 was rinsed with water and the reactor was stirred at 85° C. during 20 min. After the post polymerization was completed, 23.20 g of ammonia (25% solution in water) was added to the reaction mixture, which was then stirred for 15 min. Upon completion of the neutralization step, 0.24 g of defoaming agent D1 was added into the reactor, which was then cooled down to 75° C. and further stirred for 30 min. 109 g of water was then added to the reactor over 10 min and the reaction mixture was further stirred 60 min before cooling down to 25° C.

2482.2 g of the resulting aqueous dispersion was obtained, which virtually did not contain any coagulum. The properties are summarized in table 1.

Example 4

A polymerization reactor equipped with a temperature control module and a dosing module was charged as followed:

Initial charge #1

| 616.69 g | water |
| 18.18 g | seed latex S1 |

Initial charge #2:

1.54 g 7% b.w. aqueous solution of sodium peroxodisulfate

In the first addition vessel was prepared feed #1 by using the following components:

Feed/emulsion #1:

| 141.13 g | water |
| 16.00 g | emulsifier E1 |
| 28.72 g | emulsifier E2 |
| 14.70 g | 50% aqueous solution of AMPS |
| 444.54 g | methyl methacrylate |
| 388.11 g | n-butyl acrylate |
| 87.48 g | water (rinsing water for emulsion vessel #1) |

In the second addition vessel was prepared feed #2 by using the following components:

Feed/emulsion #2:

| | |
|---|---|
| 91.51 g | Water |
| 8.00 g | emulsifier E1 |
| 14.14 g | emulsifier E2 |
| 12.0 g | 2-ethylhexyl thioglycolate |
| 58.69 g | n-butyl acrylate |
| 265.25 g | methyl methacrylate |
| 36.00 g | methacrylic acid |
| 87.49 g | water (rinsing water for emulsion vessel #2) |

In the third addition vessel was prepared the following mixture:

Feed #3:

19.03 g 7% b.w. aqueous solution of sodium peroxodisulfate

The initial charge #1 was heated up to polymerization temperature of 85° C. under stirring at 150 rpm. Initial charge #2 was then added to the initial charge #1. The additions of feed #3 and emulsion #1 were immediately started at the same time. Feed #3 was performed over 130 min semi-continuously since dosing was stopped during 10 min between the addition of emulsion #1 and the addition of emulsion #2. Emulsion #1 was fed continuously into the reactor over 90 min. After the dosing of emulsion #1 was completed, the dosing of feed #3 was stopped and the emulsion vessel #1 was rinsed with water. After 10 min of post polymerization, the dosing of emulsion #2 and the rest of feed #3 was started at the same time. Emulsion #2 was fed continuously into the reactor over 40 min. After completion of the feeding of emulsion #2 and feed #3, the emulsion vessel #2 was rinsed with water and the reactor was stirred at 85° C. during 20 min. After the post polymerization was completed, 23.20 g of ammonia (25% solution in water) was added to the reaction mixture, which was then stirred for 15 min. Upon completion of the neutralization step, 0.24 g of defoaming agent D1 was added into the reactor, which was then cooled down to 75° C. and further stirred for 30 min. 109 g of water was then added to the reactor over 10 min and the reaction mixture was further stirred 60 min before cooling down to 25° C.

2482.2 g of the resulting aqueous dispersion was obtained, which virtually did not contain any coagulum. The properties are summarized in table 1.

Example 5

A polymerization reactor equipped with a temperature control module and a dosing module was charged as followed:

Initial charge #1

| | |
|---|---|
| 255.21 g | water |
| 15.15 g | seed latex S1 |

Initial charge #2:

28.57 g 7% b.w. aqueous solution of sodium peroxodisulfate)

In the first addition vessel was prepared feed #1 by using the following components:

Feed/emulsion #1:

| | |
|---|---|
| 109.65 g | water |
| 6.67 g | emulsifier E1 |
| 75.00 g | 2-ethylhexyl acrylate |
| 135.00 g | methyl methacrylate |
| 140.00 g | n-butyl acrylate |
| 36.45 g | water (rinsing water for emulsion vessel #1) |

In the second addition vessel was prepared feed #2 by using the following components:

Feed/emulsion #2:

| | |
|---|---|
| 89.85 g | water |
| 3.33 g | emulsifier E1 |
| 2.40 g | 2-ethylhexyl thioglycolate |
| 11.50 g | n-butyl acrylate |
| 123.50 g | methyl methacrylate |
| 15.00 g | methacrylic acid |
| 36.45 g | water (rinsing water for emulsion vessel #2) |

The initial charge #1 was heated up (polymerization temperature: 80° C., stirring speed: 150 rpm). Initial charge #2 was then added to the initial charge #1 in 7 min. The addition of emulsion #1 was immediately started. Emulsion #1 was fed continuously into the reactor over 90 min. After the dosing of emulsion #1 was completed, the emulsion vessel #1 was rinsed with water. After 10 min of post polymerization, the dosing of emulsion #2 was started. Emulsion #2 was fed continuously into the reactor over 40 min. After completion of the feeding of emulsion #2, the emulsion vessel #2 was rinsed with water and the reactor was stirred at 80° C. during 20 min. After the post polymerization was completed, 12.40 g of ammonia (25% solution in water) was added to the reaction mixture, which was then stirred for 15 min. Upon completion of the neutralization step, 0.10 g of defoaming agent D1 was added into the reactor, which was then cooled down to 75° C. and further stirred for 30 min. 107 g of water was then added to the reactor over 10 min and the reaction mixture was further stirred 60 min before cooling down to 25° C.

1211.2 g of the resulting aqueous dispersion was obtained, which virtually did not contain any coagulum. The properties are summarized in table 1.

Example 6

A polymerization reactor equipped with a temperature control module and a dosing module was charged as followed:

Initial charge #1

| | |
|---|---|
| 255.21 g | water |
| 15.15 g | seed latex S1 |

Initial charge #2:

28.57 g 7% b.w. aqueous solution of sodium peroxodisulfate)

In the first addition vessel was prepared feed #1 by using the following components:

Feed/emulsion #1:

| 109.65 g | water |
| 6.67 g | emulsifier E1 |
| 75.00 g | 2-ethylhexyl acrylate |
| 135.00 g | methyl methacrylate |
| 140.00 g | n-butyl acrylate |
| 36.45 g | water (rinsing water for emulsion vessel #1) |

In the second addition vessel was prepared feed #2 by using the following components:

Feed/emulsion #2:

| 89.85 g | water |
| 3.33 g | emulsifier E1 |
| 2.40 g | 2-ethylhexyl thioglycolate |
| 11.50 g | n-butyl acrylate |
| 121.00 g | methyl methacrylate |
| 17.50 g | methacrylic acid |
| 36.45 g | water (rinsing water for emulsion vessel #2) |

The initial charge #1 was heated up to polymerization temperature of 80° C. under stirring with 150 rpm). Initial charge #2 was then added to the initial charge #1 in 7 min. The addition of emulsion #1 was immediately started. Emulsion #1 was fed continuously into the reactor over 90 min. After the dosing of emulsion #1 was completed, the emulsion vessel #1 was rinsed with water. After 10 min of post polymerization, the dosing of emulsion #2 was started. Emulsion #2 was fed continuously into the reactor over 40 min. After completion of the feeding of emulsion #2, the emulsion vessel #2 was rinsed with water and the reactor was stirred at 80° C. during 20 min. After the post polymerization was completed, 14.66 g of ammonia (25% solution in water) was added to the reaction mixture, which was then stirred for 15 min. Upon completion of the neutralization step, 0.10 g of defoaming agent D1 was added into the reactor, which was then cooled down to 75° C. and further stirred for 30 min. 107 g of water was then added to the reactor over 10 min and the reaction mixture was further stirred 60 min before cooling down to 25° C.

1212.6 g of the resulting aqueous dispersion was obtained, which virtually did not contain any coagulum. The properties are summarized in table 1.

Example 7

A polymerization reactor equipped with a temperature control module and a dosing module was charged as followed:

Initial charge #1

| 255.21 g | water |
| 15.15 g | seed latex S1 |

Initial charge #2:

28.57 g 7% b.w. aqueous solution of sodium peroxodisulfate

In the first addition vessel was prepared feed #1 by using the following components:

Feed/emulsion #1:

| 109.65 g | water |
| 6.67 g | emulsifier E1 |
| 75.00 g | 2-ethylhexyl acrylate |
| 135.00 g | methyl methacrylate |
| 140.00 g | n-butyl acrylate |
| 36.45 g | water (rinsing water for emulsion vessel #1) |

In the second addition vessel was prepared feed #2 by using the following components:

Feed/emulsion #2:

| 89.85 g | water |
| 3.33 g | emulsifier E1 |
| 2.40 g | 2-ethylhexyl thioglycolate |
| 11.50 g | n-butyl acrylate |
| 117.50 g | methyl methacrylate |
| 21.00 g | methacrylic acid |
| 36.45 g | water (rinsing water for emulsion vessel #2) |

In the third addition vessel was prepared the following mixture:

The initial charge #1 was heated up to polymerization temperature of 80° C. under stirring with 150 rpm). Initial charge #2 was then added to the initial charge #1 in 7 min. The addition of emulsion #1 was immediately started. Emulsion #1 was fed continuously into the reactor over 90 min. After the dosing of emulsion #1 was completed, the emulsion vessel #1 was rinsed with water. After 10 min of post polymerization, the dosing of emulsion #2 was started. Emulsion #2 was fed continuously into the reactor over 40 min. After completion of the feeding of emulsion #2, the emulsion vessel #2 was rinsed with water and the reactor was stirred at 80° C. during 20 min. After the post polymerization was completed, 17.50 g of ammonia (25% solution in water) was added to the reaction mixture, which was then stirred for 15 min. Upon completion of the neutralization step, 0.10 g of defoaming agent D1 was added into the reactor, which was then cooled down to 75° C. and further stirred for 30 min. 107 g of water was then added to the reactor over 10 min and the reaction mixture was further stirred 60 min before cooling down to 25° C.

1214.2 g of the resulting aqueous dispersion was obtained, which virtually did not contain any coagulum. The properties are summarized in table 1.

Example 8

A polymerization reactor equipped with a temperature control module and a dosing module was charged as followed:

Initial charge #1

| 616.68 g | water |
| 18.18 g | seed latex S1 |

In the first addition vessel was prepared feed #1 by using the following components:

Feed/emulsion #1:

| | |
|---|---|
| 262.00 g | water |
| 16.00 g | emulsifier E1 |
| 28.71 g | emulsifier E2 |
| 180.00 g | 2-ethylhexyl acrylate |
| 324.00 g | methyl methacrylate |
| 336.00 g | n-butyl acrylate |
| 87.48 g | water (rinsing water for emulsion vessel #1) |

In the second addition vessel was prepared feed #2 by using the following components:

Feed/emulsion #2:

| | |
|---|---|
| 246.00 g | water |
| 8.00 g | emulsifier E1 |
| 14.14 g | emulsifier E2 |
| 12.0 g | 2-ethylhexyl thioglycolate |
| 27.60 g | n-butyl acrylate |
| 282.00 g | methyl methacrylate |
| 50.40 g | methacrylic acid |
| 87.48 g | water (rinsing water for emulsion vessel #2) |

In the third addition vessel was prepared the following mixture:

Feed #3:

20.57 g 7% b.w. aqueous solution of sodium peroxodisulfate

Feed #4:

34.29 g 7% b.w. aqueous solution of sodium peroxodisulfate

The initial charge #1 was heated up to polymerization temperature of 80° C. under stirring at 150 rpm. The additions of feed #3 and emulsion #1 were immediately started at the same time and completed in 90 min. After the dosing of emulsion #1 and feed #3 was completed, the emulsion vessel #1 was rinsed with water. After 10 min of post polymerization, feed #4 was added in one shot and the dosing of emulsion #2 was immediately started. Emulsion #2 was fed continuously into the reactor over 40 min. After completion of the feeding of emulsion #2, the emulsion vessel #2 was rinsed with water and the reactor was stirred at 85° C. during 20 min. After the post polymerization was completed, 42.00 g of ammonia (25% solution in water) was added to the reaction mixture, which was then stirred for 15 min. Upon completion of the neutralization step, 0.24 g of defoaming agent D1 was added into the reactor, which was then cooled down to 75° C. and further stirred for 30 min. 246 g of water was then added to the reactor over 10 min and the reaction mixture was further stirred 60 min before cooling down to 25° C.

2940.72 g of the resulting aqueous dispersion was obtained, which virtually did not contain any coagulum. The properties are summarized in table 1.

Example 9

A polymerization reactor equipped with a temperature control module and a dosing module was charged as followed:

Initial charge #1

| | |
|---|---|
| 616.68 g | water |
| 18.18 g | seed latex S1 |

In the first addition vessel was prepared feed #1 by using the following components:

Feed/emulsion #1:

| | |
|---|---|
| 300.00 g | water |
| 17.14 g | emulsifier E1 |
| 30.77 g | emulsifier E2 |
| 192.86 g | 2-ethylhexyl acrylate |
| 347.14 g | methyl methacrylate |
| 360.00 g | n-butyl acrylate |
| 87.48 g | water (rinsing water for emulsion vessel #1) |

In the second addition vessel was prepared feed #2 by using the following components:

Feed/emulsion #2:

| | |
|---|---|
| 209.07 g | water |
| 6.67 g | emulsifier E1 |
| 11.79 g | emulsifier E2 |
| 10.00 g | 2-ethylhexyl thioglycolate |
| 23.00 g | n-butyl acrylate |
| 235.00 g | methyl methacrylate |
| 42.00 g | methacrylic acid |
| 87.48 g | water (rinsing water for emulsion vessel #2) |

In the third addition vessel was prepared the following mixture:

Feed #3:

22.04 g 7% b.w. aqueous solution of sodium peroxodisulfate

Feed #4:

28.57 g 7% b.w. aqueous solution of sodium peroxodisulfate

The initial charge #1 was heated up to polymerization temperature of 80° C. under stirring with 150 rpm. The additions of feed #3 and emulsion #1 were immediately started at the same time and completed in 90 min. After the dosing of emulsion #1 and feed #3 was completed, the emulsion vessel #1 was rinsed with water. After 10 min of post polymerization, feed #4 was added in one shot and the dosing of emulsion #2 was immediately started. Emulsion #2 was fed continuously into the reactor over 40 min. After completion of the feeding of emulsion #2, the emulsion vessel #2 was rinsed with water and the reactor was stirred at 85° C. during 20 min. After the post polymerization was completed, 35.00 g of ammonia (25% solution in water) was added to the reaction mixture, which was then stirred for 15 min. Upon completion of the neutralization step, 0.24 g of defoaming agent D1 was added into the reactor, which was then cooled down to 75° C. and further stirred for 30 min. 246 g of water was then added to the reactor over 10 min and the reaction mixture was further stirred 60 min before cooling down to 25° C.

2940.72 g of the resulting aqueous dispersion was obtained, which virtually did not contain any coagulum. The properties are summarized in table 1.

Example 10

A polymerization reactor equipped with a temperature control module and a dosing module was charged as followed:

Initial charge #1

| | |
|---|---|
| 616.68 g | water |
| 18.18 g | seed latex S1 |

In the first addition vessel was prepared feed #1 by using the following components:

Feed/emulsion #1:

| | |
|---|---|
| 346.00 g | water |
| 18.29 g | emulsifier E1 |
| 32.82 g | emulsifier E2 |
| 205.71 g | 2-ethylhexyl acrylate |
| 370.29 g | methyl methacrylate |
| 384.00 g | n-butyl acrylate |
| 87.48 g | water (rinsing water for emulsion vessel #1) |

In the second addition vessel was prepared feed #2 by using the following components:

Feed/emulsion #2:

| | |
|---|---|
| 164.13 g | water |
| 5.33 g | emulsifier E1 |
| 9.43 g | emulsifier E2 |
| 8.00 g | 2-ethylhexyl thioglycolate |
| 18.40 g | n-butyl acrylate |
| 188.00 g | methyl methacrylate |
| 33.60 g | methacrylic acid |
| 87.48 g | water (rinsing water for emulsion vessel #2) |

In the third addition vessel was prepared the following mixture:

Feed #3:
23.51 g 7% b.w. aqueous solution of sodium peroxodisulfate

Feed #4:
22.86 g 7% b.w. aqueous solution of sodium peroxodisulfate

The initial charge #1 was heated up to polymerization temperature of 80° C. under stirring with 150 rpm. The additions of feed #3 and emulsion #1 were immediately started at the same time and completed in 90 min. After the dosing of emulsion #1 and feed #3 was completed, the emulsion vessel #1 was rinsed with water. After 10 min of post polymerization, feed #4 was added in one shot and the dosing of emulsion #2 was immediately started. Emulsion #2 was fed continuously into the reactor over 40 min. After completion of the feeding of emulsion #2, the emulsion vessel #2 was rinsed with water and the reactor was stirred at 85° C. during 20 min. After the post polymerization was completed, 30.00 g of ammonia (25% solution in water) was added to the reaction mixture, which was then stirred for 15 min. Upon completion of the neutralization step, 0.24 g of defoaming agent D1 was added into the reactor, which was then cooled down to 75° C. and further stirred for 30 min. 246 g of water was then added to the reactor over 10 min and the reaction mixture was further stirred 60 min before cooling down to 25° C.

2917.37 g of an aqueous dispersion was obtained, which virtually did not contain any coagulum. The properties are summarized in table 1.

Example 11

A polymerization reactor equipped with a temperature control module and a dosing module was charged as followed:

Initial charge #1

| | |
|---|---|
| 612.51 g | water |
| 36.36 g | seed latex S1 |

Initial charge #2:
68.57 g sodium peroxodisulfate (7% solution in water)

In the first addition vessel was prepared feed #1 by using the following components:

Feed/emulsion #1:

| | |
|---|---|
| 263.16 g | water |
| 16.00 g | emulsifier E1 |
| 180.00 g | 2-ethylhexyl acrylate |
| 324.00 g | methyl methacrylate |
| 336.00 g | n-butyl acrylate |
| 87.48 g | water (rinsing water for emulsion vessel #1) |

In the second addition vessel was prepared feed #2 by using the following components:

Feed/emulsion #2:

| | |
|---|---|
| 248.10 g | water |
| 8.00 g | emulsifier E1 |
| 12.00 g | 2-ethylhexyl thioglycolate |
| 27.60 g | n-butyl acrylate |
| 282.00 g | methyl methacrylate |
| 50.40 g | methacrylic acid |
| 87.48 g | water (rinsing water for emulsion vessel #2) |

The initial charge #1 was heated up to polymerization temperature of 80° C. under stirring with 150 rpm. Initial charge #2 was then added to the initial charge #1 in 7 min. The addition of emulsion #1 was immediately started. Emulsion #1 was fed continuously into the reactor over 90 min. After the dosing of emulsion #1 was completed, the emulsion vessel #1 was rinsed with water. After 10 min of post polymerization, the dosing of emulsion #2 was started. Emulsion #2 was fed continuously into the reactor over 40 min. After completion of the feeding of emulsion #2, the emulsion vessel #2 was rinsed with water and the reactor was stirred at 80° C. during 20 min. After the post polymerization was completed, 42.00 g of ammonia (25% solution in water) was added to the reaction mixture, which was then stirred for 15 min. Upon completion of the neutralization step, 0.24 g of defoaming agent D1 was added into the reactor, which was then cooled down to 75° C. and further stirred for 30 min. 246 g of water was then added to the reactor over 10 min and the reaction mixture was further stirred 60 min before cooling down to 25° C.

2928.9 g o fan aqueous dispersion was obtained, which virtually did not contain any coagulum. The properties are summarized in table 1.

Example 12

A polymerization reactor equipped with a temperature control module and a dosing module was charged as followed:

Initial charge #1

| | |
|---|---|
| 612.51 g | water |
| 36.36 g | seed latex S1 |

Initial charge #2:
68.57 g 7% b.w. aqueous solution of sodium peroxodisulfate

In the first addition vessel was prepared feed #1 by using the following components:

Feed/emulsion #1:

| | |
|---|---|
| 263.16 g | water |
| 16.00 g | emulsifier E1 |
| 180.00 g | 2-ethylhexyl acrylate |
| 324.00 g | methyl methacrylate |
| 336.00 g | n-butyl acrylate |
| 87.48 g | water (rinsing water for emulsion vessel #1) |

In the second addition vessel was prepared feed #2 by using the following components:

Feed/emulsion #2:

| | |
|---|---|
| 248.10 g | water |
| 8.00 g | emulsifier E1 |
| 12.00 g | 2-ethylhexyl thioglycolate |
| 27.60 g | n-butyl acrylate |
| 296.40 g | methyl methacrylate |
| 36.00 g | methacrylic acid |
| 87.48 g | water (rinsing water for emulsion vessel #2) |

In the third addition vessel was prepared the following mixture:

The initial charge #1 was heated up to polymerization temperature of 80° C. under stirring with 150 rpm. Initial charge #2 was then added to the initial charge #1 in 7 min. The addition of emulsion #1 was immediately started. Emulsion #1 was fed continuously into the reactor over 90 min. After the dosing of emulsion #1 was completed, the emulsion vessel #1 was rinsed with water. After 10 min of post polymerization, the dosing of emulsion #2 was started. Emulsion #2 was fed continuously into the reactor over 40 min. After completion of the feeding of emulsion #2, the emulsion vessel #2 was rinsed with water and the reactor was stirred at 80° C. during 20 min. After the post polymerization was completed, 36.00 g of ammonia (25% solution in water) was added to the reaction mixture, which was then stirred for 15 min. Upon completion of the neutralization step, 0.24 g of defoaming agent D1 was added into the reactor, which was then cooled down to 75° C. and further stirred for 30 min. 246 g of water was then added to the reactor over 10 min and the reaction mixture was further stirred 60 min before cooling down to 25° C.

2922.9 g of an aqueous dispersion was obtained, which virtually did not contain any coagulum. The properties are summarized in table 1.

Example 13

A polymerization reactor equipped with a temperature control module and a dosing module was charged as followed:

Initial charge #1

| | |
|---|---|
| 571.43 g | water |
| 37.88 g | seed latex S1 |

Initial charge #2:
2.14 g 7% b.w. aqueous solution of sodium peroxodisulfate

In the first addition vessel was prepared feed #1 by using the following components:

Feed/emulsion #1:

| | |
|---|---|
| 150.00 g | water |
| 16.67 g | emulsifier E1 |
| 4.38 g | trimethylolpropane triacrylate |
| 25.00 g | 50% aqueous solution of AMPS |
| 414.38 g | methyl methacrylate |
| 443.75 g | n-butyl acrylate |
| 31.25 g | emulsifier E2 |
| 91.13 g | water (rinsing water for emulsion vessel #1) |

In the second addition vessel was prepared feed #2 by using the following components:

Feed/emulsion #2:

| | |
|---|---|
| 65.80 g | water |
| 8.33 g | emulsifier E1 |
| 13.39 g | emulsifier E2 |
| 1.88 g | trimethylolpropane triacrylate |
| 12.50 g | 2-ethylhexyl thioglycolate |
| 37.50 g | n-butyl acrylate |
| 298.13 g | methyl methacrylate |
| 37.50 g | methacrylic acid |
| 91.13 g | water (rinsing water for emulsion vessel #2) |

In the third addition vessel was prepared the following mixture:

Feed #3:
17.86 g 7% b.w. aqueous solution of sodium peroxodisulfate

The initial charge #1 was heated up to polymerization temperature of 85° C. under stirring with 150 rpm. Initial charge #2 was then added to the initial charge #1. The additions of feed #3 and emulsion #1 were immediately started at the same time. Feed #3 was performed over 130 min continuously while feeding of emulsion #1 was fed continuously into the reactor over 90 min. After the dosing of emulsion #1 was completed, the emulsion vessel #1 was rinsed with water and the dosing of emulsion #2 was immediately started. Emulsion #2 was fed continuously into the reactor over 40 min. After completion of the feeding of emulsion #2 and feed #3, the emulsion vessel #2 was rinsed with water and the reactor was stirred at 85° C. during 20 min. After the post polymerization was completed, 20.17 g of ammonia (25% solution in water) was added to the reaction mixture, which was then stirred for 15 min. Upon completion of the neutralization step, 0.25 g of defoaming agent D1 was added into the reactor, which was then cooled down to 75° C. and further stirred for 30 min. 103 g of water was then added to the reactor over 10 min and the reaction mixture was further stirred 60 min before cooling down to 25° C.

2496.0 g of an aqueous dispersion was obtained, which virtually did not contain any coagulum. The properties are summarized in table 1.

Example 14: (Comparative Example)

A polymerization reactor equipped with a temperature control module and a dosing module was charged as followed:
Initial charge #1

| | |
|---|---|
| 415.92 g | water |
| 32.50 g | seed latex S1 |

Initial charge #2:
18.93 g 50% aqueous solution of AMPS
In the first addition vessel was prepared feed #1 by using the following components:
Feed/emulsion #1:

| | |
|---|---|
| 472.18 g | water |
| 18.59 g | emulsifier E3 |
| 54.08 g | emulsifier E2 |
| 6.06 g | 50% aqueous solution of AMPS |
| 12.02 g | acrylamide (50% solution in water) |
| 596.65 g | n-butyl acrylate |
| 646.42 g | methyl methacrylate |
| 59.16 g | water (rinsing water for emulsion vessel #1) |

In the second addition vessel was prepared the following mixture:
Feed #2:

| | |
|---|---|
| 47.86 g | 7% b.w. aqueous solution of sodium peroxodisulfate |
| 12.31 g | water |

The initial charge #1 was heated up to polymerization temperature of 90° C. under stirring with 150 rpm. Initial charge #2 was then added to the initial charge #1 and the mixture was stirred for 5 min. The additions of emulsion #1 and feed #2 were immediately started at the same time. Feed #2 was performed over 210 min continuously while feeding of emulsion #1 was performed continuously into the reactor over 180 min. After the dosing of feed #2 was completed, the reactor was stirred at 90° C. for 30 min and then cooled to 85° C. Upon completion of the postpolymerization, 11.7 g of a 10% aqueous solution of tert-butylhydroperoxide and 8.75 g of a 10% aqueous solution of sodium hydroxymethylsulfinate were added over 1 h. 2.84 g of 5% hydrogen peroxide was then added as a shot into the reactor, which was further stirred for 10 min at 85° C. The resulting dispersion was neutralized with 2.40 g of ammonia (25% solution in water) and stirred for 10 min before it was cooled to 25° C.

2500.1 g of an aqueous dispersion was obtained, which virtually did not contain any coagulum. The properties are summarized in table 1.

Example 15

A polymerization reactor equipped with a temperature control module and a dosing module was charged as followed:
Initial charge #1

| | |
|---|---|
| 616.68 g | water |
| 18.18 g | seed latex S1 |

Initial charge #2:
1.54 g sodium peroxodisulfate (7% solution in water)
In the first addition vessel was prepared feed #1 by using the following components:
Feed/emulsion #1:

| | |
|---|---|
| 141.12 g | water |
| 16.00 g | emulsifier E1 |
| 28.71 g | emulsifier E2 |
| 14.70 g | 50% aqueous solution of AMPS |
| 4.20 g | trimethylolpropane triacrylate |
| 412.76 g | methyl methacrylate |
| 415.70 g | n-butyl acrylate |
| 87.48 g | water (rinsing water for emulsion vessel #1) |

In the second addition vessel was prepared feed #2 by using the following components:
Feed/emulsion #2:

| | |
|---|---|
| 91.51 g | water |
| 8.00 g | emulsifier E1 |
| 14.14 g | emulsifier E2 |
| 12.0 g | 2-ethylhexyl thioglycolate |
| 1.80 g | trimethylolpropane triacrylate |
| 57.84 g | n-butyl acrylate |
| 264.36 g | methyl methacrylate |
| 36.00 g | methacrylic acid |
| 87.48 g | water (rinsing water for emulsion vessel #2) |

In the third addition vessel was prepared the following mixture:
Feed #3:
19.03 g 7% b.w. aqueous solution of sodium peroxodisulfate The initial charge #1 was heated up to polymerization temperature of 85° C. under stirring with 150 rpm. Initial charge #2 was then added to the initial charge #1. The additions of feed #3 and emulsion #1 were immediately started at the same time. Feed #3 was performed over 130 min semi-continuously since dosing was stopped during 10 min between the addition of emulsion #1 and the addition of emulsion #2. Emulsion #1 was fed continuously into the reactor over 90 min. After the dosing of emulsion #1 was completed, the dosing of feed #3 was stopped and the emulsion vessel #1 was rinsed with water. After 10 min of post polymerization, the dosing of emulsion #2 and the rest of feed #3 was started at the same time. Emulsion #2 was fed continuously into the reactor over 40 min. After completion of the feeding of emulsion #2 and feed #3, the emulsion vessel #2 was rinsed with water and the reactor was stirred at 85° C. during 20 min. After the post polymerization was completed, 23.20 g of ammonia (25% solution in water) was added to the reaction mixture, which was then stirred for 15 min. Upon completion of the neutralization step, 0.24 g of defoaming agent D1 was added into the reactor, which was then cooled down to 75° C. and further stirred for 30 min. 109 g of water was then added to the reactor over 10 min and the reaction mixture was further stirred 60 min before cooling down to 25° C.

2482.16 g of an aqueous dispersion was obtained, which virtually did not contain any coagulum. The properties are summarized in table 1.

TABLE 1

Properties of the polymer dispersions of examples 1-15

| Example | #1 (C) | #2 | #3 (C) | #4 | #5 | #6 | #7 |
|---|---|---|---|---|---|---|---|
| SC [% b.w.] | 49.5 | 49.2 | 49.4 | 49.3 | 42.5 | 41.8 | 41.4 |
| PH | 7.8 | 7.8 | 7.8 | 7.8 | 8.2 | 7.9 | 7.8 |
| Z-PS [nm] | 160 | 165 | 163 | 168 | n.d. | n.d. | n.d. |
| PDI | 0.031 | 0.038 | 0.023 | 0.026 | n.d. | n.d. | n.d. |
| HDC-PS [nm] | n.d. | n.d. | n.d. | n.d. | 157/184[1] | 142/164[1] | 127/134[1] |
| DV [mPas] | 595 | 830 | 550 | 815 | 169 | 301 | 761 |
| Tg [° C.] | n.d. | n.d. | n.d. | n.d. | −4/113 [2] | −4/114[2] | −4/119[2] |
| MFFT [C] | 0 | 0 | 16 | 17 | 0 | 0 | 0 |

| | #8 | #9 | #10 | #11 | #12 | #13 |
|---|---|---|---|---|---|---|
| SC [% b.w.] | 41.0 | 41.9 | 41.9 | 42.5 | 42.5 | 51.1 |
| pH | 8.4 | 8.9 | 8.8 | 8.5 | 9.3 | 7.4 |
| Z-PS [nm] | n.d. | n.d. | n.d. | n.d. | n.d. | 153 |
| PDI | n.d. | n.d. | n.d. | n.d. | n.d. | 0.1 |
| HDC-PS [nm] | 151/154[1] | 153/148[1] | 159/155[1] | 118/119[1] | 120/122[1] | n.d. |
| DV [mPas] | 127 | 71 | 47 | 510 | 109 | 499 |
| Tg [° C.] | −3/109[2] | n.o./109[3] | −5/119[2] | −3/120[2] | −2/111[2] | n.d. |
| MFFT [C] | 0 | 0 | 0 | 0 | 0 | 12 |

| | #14 (C) | #15 |
|---|---|---|
| SC [% b.w.] | 52.0 | 49.6 |
| pH | 9.0 | 8.4 |
| Z-PS [nm] | n.d. | 168 |
| PDI | n.d. | 0.033 |
| HDC-PS [nm] | 221/222[1] | n.d. |
| DV [mPas] | 309 | 525 |
| Tg [° C.] | n.d. | n.d.) |
| MFFT [C] | 11 | 12 |

[1] First value indicates median, second indicates mean
[2] Two different Tgs were observed
[3] Only one Tg was observed, low Tg was not observed Example 16: (Formulation with Coalescent BDG)

The polymer dispersion of example #15 was reproduced. Then 10% b.w. of BDG, based on the amounts of polymer in the polymer dispersion, was added to the obtained polymer dispersion and the mixture was stirred for 10 min at 25° C. The polymer dispersion was then stored overnight before polymer films were prepared to measure the water uptake according to method #1. BDG was added as a 1:1 mixture of $H_2O$ and water.

Example 17: (Formulation with Coalescent)

The polymer dispersion of example #15 was reproduced. Then 10% b.w. of 2,2,4-trimethyl-1,3-pentandiol monoisobutyrate, based on the amounts of polymer in the polymer dispersion, was added to the obtained polymer dispersion and the mixture was stirred for 10 min at 25° C. The dispersion was then stored overnight before polymer films were prepared to measure the water uptake according to method #1.

4. Coating Formulations (Paints)

For preparing clear coats, the polymer dispersions were used as such or formulated with a coalescent by adding the coalescent to the polymer dispersion with stirring and continue stirring for at least 10 minutes.

The polymer dispersions were formulated as waterborne paints according to the recipe of table 2. For this, the ingredients were mixed by means of a dispersing machine in the order given in table 2.

Dispersant: 25% by weight aqueous solution of the sodium salt of a polyacrylic acid with average molecular mass of 12000 g/mol (Dispex® CX4320 of BASF SE)

Defoamer: Mineral oil based defoamer (Foamaster® M02134 of BASF SE)

Thickener 1: Aqueous formulation of a hydroxyethylcellulose

Thickener 2: 30 wt.-% aqueous formulation of an hydrophobic modified polyether associative thickener (Rheovis® PE 1330 of BASF SE)

$TiO_2$ pigment: Rutile type titanium dioxide pigment (Kronos 2190)

Filler 1: Calcium carbonate with average particle size d50 of 5.0 μm (Omyacarb GU of Omya GmbH)

Filler 2: Mg-Silicate with average particle size d50 of 4.5 μm (Finntalc M15 of Mondo Minerals B.V.)

TABLE 2

Paint formulations

|  | without coalescent | with coalescent |
|---|---|---|
| Water | 150 g | 150 g |
| Thickener 1 | 2 g | 2 g |
| Ammonia | 2 g | 2 g |
| Dispersant | 3 g | 3 g |
| Defoamer | 2 g | 2 g |
| TiO$_2$ pigment | 190 g | 190 g |
| Filler 1 | 180 g | 180 g |
| Filler 2 | 50 g | 50 g |
| Coalescent | 0 g | 15 g |
| Polymer Dispersion | 325 g | 325 g |
| Coalescent | 0 | 15 g |
| Defoamer | 3 g | 3 g |
| Thickener 2 | 4 g | 4 g |
| Water | 89 g | 74 g |
|  | 1000 g | 1000 g |

Polymer Dispersions of Examples 3 and 4 were formulated with coalescents to guarantee a sufficiently low MFFT for appropriate film formation.

TABLE 3

Application properties of the polymer dispersions of examples 1-4

|  |  | Example 1 [1, 2] | Example 2 [1] | Example 3 [1, 3] | Example 4 [1, 3] |
|---|---|---|---|---|---|
| Clear coat | MFFT (dispersion) | 0° C. | 0° C. | 16° C. | 17° C. |
| | Gloss at 60° (u.a) | 93 | 94 | 92 | 89 |
| | Pendulum hardness (s) | 54.6 | 51.8 | 106.4 | 106.4 |
| Paint [4] | Pendulum hardness (s) | 57.4 | 54.6 | 32.2 | 32.2 |
| | Max. crack-free film thickness (μm) | 500 | 850 | 500 | 800 |
| | Water uptake method #1 (%) | 9.1 | 9.5 | 14.7 | 12.6 |

[1] Comparative example
[2] The respective clear coats and paints were formulated without coalescents and/or solvents.
[3] The respective clear coats and paints were formulated with coalescents and/or solvents (15 g BDG in 324 g of dispersion).
[4] Polymer dispersions were formulated as paint according to the recipe of table 2.

As can be seen from table 3, the paints based on the polymer dispersions of examples 2 and 4 can be applied with higher film thickness without cracking than paints based on the polymer dispersions of comparative examples 1 and 3.

TABLE 4

Application properties of the polymer dispersions of examples 5-7

|  |  | Example 5 | Example 6 | Example 7 |
|---|---|---|---|---|
| Amount of MAA in stage 2 | | 10.1% | 11.7% | 14.0% |
| MFFT (polymer dispersion) | | 0° C. | 0° C. | 0° C. |
| Clear coat [1] | Gloss at 60° (u.a) | 91 | 93 | 85 |
| | Pendulum hardness (s) | 18.8 | 19.6 | 18.4 |
| Paint [1, 2] | Pendulum hardness (s) | 57.4 | 58.8 | 58.8 |
| | Max. crack-free film thickness (μm) | 600 | 600 | 1000 |

[1] The respective clear coats and paints were formulated without the use of coalescents and/or solvents.
[2] Polymer dispersions were formulated as paint according to the recipe of table 2.

The paints based on the polymer dispersions of examples 5 and 7 can be applied with high film thickness without cracking.

TABLE 5

Application properties of the polymer dispersions of examples 8-10

|  |  | Example 8 | Example 9 | Example 10 |
|---|---|---|---|---|
| | Stage ratio (stage 1/stage 2) | 70:30 | 75:25 | 80:20 |
| | MFFT (dispersion) | 0° C. | 0° C. | 0° C. |
| Clear coat [1] | Gloss at 60° (u.a) | 95 | 90 | 90 |
| | Pendulum hardness (s) | — | 44.8 | 29.4 |
| Paint [1, 2] | Pendulum hardness (s) | 49.0 | 42.0 | 33.6 |
| | Max. crack-free film thickness (μm) | 900 | 800 | 1000 |

[1] The respective clear coats and paints were formulated without the use of coalescents and/or solvents.
[2] Polymer dispersions were formulated as paint according to the recipe of table 2.

TABLE 6

Application properties of the polymer dispersions of examples 6, 7, 11 and 12

|  |  | Example 7 | Example 11 | Example 6 | Example 12 |
|---|---|---|---|---|---|
| Amount of MAA in stage 2 | | 14% | 14% | 11.7% | 11.7% |
| Amount of chain transfer agent in stage 2 [3] | | 1.6% | 3.4% | 1.6% | 3.4% |
| MFFT (dispersion) | | 0° C. | 0° C. | 0° C. | 0° C. |
| Clear coat [1] | Gloss at 60° (u.a) | 88 | 89 | 89 | 90 |
| | Pendulum hardness (s) | 64.4 | 60.2 | 68.8 | 56.0 |
| Paint [1, 2] | Pendulum hardness (s) | 56.0 | 51.8 | 56.0 | 53.2 |
| | Max. crack-free film thickness (μm) | 850 | 1300 | 500 | 800 |

[1] The respective clear coats and paints were formulated without the use of coalescents and/or solvents.
[2] Polymer dispersions were formulated as paint according to the recipe of table 2.
[3] Amount of CTA in stage 2 as pphm CTA, based on monomers in stage 2

The polymer dispersions of example 13 and comparative example 14 were formulated as concrete roof tile formulations according to the recipes of tables 7 (clear coat) and 9 (brownish paints)

Dispersant: 25% by weight aqueous solution of the sodium salt of a polyacrylic acid with average molecular mass of 12000 g/mol (Dispex® CX4320 of BASF SE)

Defoamer 1: Aqueous emulsion of a polyethersiloxan (Tego Foamex 822 of Evonik)

Defoamer 2: Polysiloxane in polyglycol (BYK 024 of Byk Chemie GmbH)

Polymeric Plasticizer: polypropylene glycol alkylphenylether (Loxanol PL 5060 of BASF SE)

Thickener: 30 wt.-% aqueous formulation of an hydrophobic modified polyether associative thickener (Rheovis® PE 1330 of BASF SE)

Surfactant: 2,4,7,9-Tetramethyldec-5-yne-4,7-diol (50% formulation)

$TiO_2$ pigment: Rutile type titanium dioxide pigment (Kronos 2310)

$Fe_2O_3$ pigment: Yellowish iron oxide red pigment (Bayferrox® 110)

Wax dispersion: Aqueous 35% b.w. nanoscale wax dispersion (Michem Lube 368 E of Michaelman, Inc.)

Filler: Calcium Carbonate with average particle size d50 of 5.0 μm (Omyacarb 850 OG of Omya GmbH)

TABLE 7

Clear Coat formulations based on the polymer dispersions of example 13 and comparative example 14

| Clear Coat Formulation | Product A | Product B | Product C | Product D |
|---|---|---|---|---|
| Polymer dispersion example | 13 | 13 | 14 (C) | 14 (C) |
| Amount polymer dispersion (g) | 965.25 | 965.25 | 963.39 | 963.39 |
| Water (g) | 34.75 | 34.75 | 36.61 | 36.61 |
| BDG (g) | 10 | 30 | 10 | 30 |
| Polymeric plasticizer (g) | 20 | 0 | 20 | 0 |
| Defoamer 1 (g) | 3.5 | 3.5 | 3.5 | 3.5 |
| Total (g) | 1033.5 | 1033.5 | 1033.5 | 1033.5 |

TABLE 8

Application properties of clear coats based on the polymer dispersions of example 13 and comparative example 14

| Clear Coat Formulation | Product A | Product B | Product C | Product D |
|---|---|---|---|---|
| MFFT (before formulation) (° C.) | 12 | 12 | 14 | 14 |
| MFFT (after formulation) (° C.) | 3 | 0 | 5 | 0 |
| SOR (25° C.) [1] | 83 | 77 | 73 | 80 |
| SOR (80° C.) [1] | 53 | 66 | 32 | 35 |
| WU after 3 h | 2.6 | 2.6 | 4.2 | 3.8 |
| WU after 24 h | 5.9 | 6.2 | 10.8 | 9.6 |
| WU after 48 h | 7.7 | 7.5 | 15.4 | 14.3 |
| WU after 72 h | 9.3 | 9.0 | 19.9 | 18.3 |

[1] The SOR was measured on the basis of the following calculation: L/L0*100 (%), where L0 is the L-value before application of dirt, and L is the L-value after application of dirt.

As can be seen from table 8, the clear coats based on example 13 shows better soiling resistance and reduced water uptake, in particular after prolonged exposure, than clear coats based on comparative example 14.

TABLE 9

Paint formulations based on the polymer dispersions of example 13 and comparative example 14

| | Paint A | Paint B | Paint C | Paint D |
|---|---|---|---|---|
| Water (g) | 92 | 92 | 92 | 92 |
| Thickener (g) | 0.5 | 0.5 | 0.5 | 0.5 |
| Dispersant (g) | 15 | 15 | 15 | 15 |
| Surfactant (g) | 1 | 1 | 1 | 1 |
| Defoamer 2 (g) | 3 | 3 | 3 | 3 |
| $TiO_2$ pigment (g) | 30.7 | 30.7 | 30.7 | 30.7 |
| $Fe_2O_3$ pigment (g) | 173.7 | 173.7 | 173.7 | 173.7 |
| Filler (g) | 27 | 27 | 27 | 27 |
| Clear Coat formulation amount (g) | Product A 596.6 | Product B 596.6 | Product C 596.6 | Product D 596.6 |
| Wax dispersion (35%) (g) | 24 | 24 | 24 | 24 |
| Total (g) | 963.5 | 963.5 | 963.5 | 963.5 |

TABLE 10

Application properties of paints based on the polymer dispersions of example 13 and comparative example 14

| | Paint A | Paint B | Paint C | Paint D |
|---|---|---|---|---|
| SOR (25° C.) [1] | 74 | 77 | 71 | 74 |
| SOR (80° C.) [1] | 57 | 63 | 53 | 53 |
| WU after 24 h | 7.8 | 7 | 9.1 | 8.3 |
| WU after 48 h | 6.9 | 6 | 8.9 | 7.8 |
| WU after 72 h | 6.4 | 5.9 | 8.5 | 7.9 |

[1] The SOR was measured on the basis of the following calculation: L/L0*100 (%), where L0 is the L-value before application of dirt, and L is the L-value after application of dirt.

As can be seen from table 10, the paints based on example 13 shows better soiling resistance and reduced water uptake in comparison to paints based on comparative example 14.

TABLE 11

Application testing of the polymer dispersions of examples 15 to 17

| | Example 15 | Example 16 | Example 17 |
|---|---|---|---|
| Plasticizer | No solvent | 10% BDG | 10% Texanol |
| Water uptake method #1 after 24 h (%) | — 1) | 21.4% | 280.2% |

1) Not measurable

The invention claimed is:

1. A process for producing an aqueous polymer dispersion, which comprises a multistage aqueous radical emulsion polymerization of ethylenically unsaturated monomers M, comprising
 a) at least one non-ionic monoethylenically unsaturated monomer M1 having a solubility in deionized water of at most 60 g/L at 25° C. and 1 bar,
 b) at least one monoethylenically unsaturated monomer M2 selected from monomers having an acid group and their salts, and
 c) optionally one or more ethylenically unsaturated monomers M3, which are different from the monomers M1 and M2,
where the process comprises
 i) a first step of an aqueous radical emulsion polymerization of a first monomer composition M.a consisting of monomers M1, optionally M2 and optionally M3, to obtain a first aqueous polymer dispersion, where the monomer composition M.a comprises less than 2% by weight, based on the total weight of the monomers of the monomer composition M.a, of monomers M2, and subsequently ii) at least one further aqueous radical emulsion polymerization step of a second monomer composition M.b consisting of monomers M1, M2 and optionally M3, where the second step is performed in the aqueous polymer dispersion of the first step and in the presence of a chain transfer agent T, where the monomer composition M.b comprises 3 to 20% by weight, based on the total weight of the monomers of the monomer composition M.b, of at least one monomer M2, where the monomers M2 present in the monomer composition M.a are selected from the group consisting of monomers M2.1, monoethylenically unsaturated monocarboxylic acids having 3 to 6 carbon atoms, monomers M2.3, monoethylenically unsaturated sulfonic acids and the salts thereof, and monomers M2.4, monoethylenically unsaturated monomers having a phosphate or phosphoryl group and the salts thereof, where the amount of monomers M2.1 present in the monomer composition M.a is at most 0.1% by weight, based on the total amount of monomers in the monomer composition M.a, where the monomer composition M.a corresponds to a theoretical glass transition temperature Tg' (a) of at most 50° C. and the monomer composition M.b corresponds to a theoretical glass transition temperature Tg' (b) of at least 40° C., where the difference Tg' (b)–Tg' (a) is at least 10° C.; where the weight ratio of the total weight of monomers of monomer composition M.a to the total weight of monomers of monomer composition M.b is in the range from 50:50 to 87:13.

2. The process of claim 1, where the chain transfer agent T is selected from compounds having a thiol group.

3. The process of claim 1, where the amount of chain transfer agent in step ii) is in the range of 0.5 to 5% by weight, based on the total weight of the monomers of the monomer composition M.b.

4. The process according to claim 1, where the emulsion polymerization of step i) is carried out in essential absence of a chain transfer agent.

5. The process of claim 1, where the monomer composition M.a comprises 90 to 100% by weight, based on the total weight of the monomers of the monomer composition M.a, of at least one monomer M1.

6. The process of claim 1, where the monomer composition M.b consists of a) 80 to 98% by weight, based on the total weight of the monomers of the monomer composition M.b, of at least one monomer M1, b) 2 to 20% by weight, based on the total weight of the monomers of the monomer composition M.b, of at least one monomer M2, and optionally c) 0 to 10% by weight, based on the total weight of the monomers of the monomer composition M.b, of one more monomers M3.

7. The process of claim 1, where the monomers M1 are selected from the group consisting of $C_1$-$C_{20}$-alkyl esters of acrylic acid, $C_1$-$C_{20}$-alkylesters of methacrylic acid, and mixtures thereof.

8. The process of claim 1, where the monomers M comprise less than 10% by weight, based on the total weight of monomers M, of vinylaromatic monomers.

9. The process of claim 1, where the monomers M2 of the monomer composition M.b comprise at least 70% by weight, based on the total weight of monomers M2 in the monomer composition M.b, of methacrylic acid.

10. An aqueous polymer dispersion obtainable by the process of claim 1.

11. The aqueous polymer dispersion of claim 10 where the volume average particle size of the polymer particles, as determined by dynamic light scattering is in the range of 50 to 500 nm, in particular in the range of 80 to 300 nm.

12. A water-borne coating composition containing the aqueous polymer dispersion according to claim 10.

13. The waterborne coating composition of claim 12, which contains at least one inorganic particulate material selected from the group consisting of inorganic pigments and inorganic fillers, where the amount of inorganic particulate material is in the range from 10 to 90%, based on the total weight of the solids in the waterborne coating composition, and where the amount of the polymer of the aqueous polymer dispersion is in the range from 5 to 50% by weight, based on the total weight of the coating composition.

14. A method of producing a coating on a surface comprising (a) applying the water-borne coating composition according to claim 12 to a surface to be coated, and (b) allowing the composition to dry to produce the coating.

15. The method of claim 14, where the surface is selected from mineral surfaces and concrete surfaces.

* * * * *